(12) United States Patent
Matsuura

(10) Patent No.: US 10,248,366 B2
(45) Date of Patent: Apr. 2, 2019

(54) INFORMATION PROCESSING DEVICE, INFORMATION PROCESSING SYSTEM, AND INFORMATION PROCESSING METHOD

(71) Applicant: Hiroki Matsuura, Tokyo (JP)

(72) Inventor: Hiroki Matsuura, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/702,218

(22) Filed: Sep. 12, 2017

(65) Prior Publication Data

US 2018/0074760 A1    Mar. 15, 2018

(30) Foreign Application Priority Data

Sep. 15, 2016  (JP) ................. 2016-180202
Jul. 31, 2017  (JP) ................. 2017-148474

(51) Int. Cl.
*G06F 3/12* (2006.01)
*H04N 1/00* (2006.01)

(52) U.S. Cl.
CPC .......... *G06F 3/1225* (2013.01); *G06F 3/1204* (2013.01); *G06F 3/1254* (2013.01); *G06F 3/1284* (2013.01); *G06F 3/1285* (2013.01); *H04N 1/00244* (2013.01); *H04N 1/00411* (2013.01)

(58) Field of Classification Search
CPC combination set(s) only.
See application file for complete search history.

(56) References Cited

U.S. PATENT DOCUMENTS

| 7,885,551 | B2 | 2/2011 | Matsuura et al. |
| 8,169,645 | B2 | 5/2012 | Matsuura et al. |
| 9,471,328 | B2 | 10/2016 | Fukasawa |
| 2013/0246777 | A1* | 9/2013 | Fukasawa ............. G06F 9/4401 713/1 |

FOREIGN PATENT DOCUMENTS

JP    2013-190897    9/2013

* cited by examiner

*Primary Examiner* — Helen Zong
(74) *Attorney, Agent, or Firm* — IPUSA, PLLC

(57) ABSTRACT

There is provided an information processing device for controlling printing. The information processing device includes a processor and a memory that stores instructions, which when executed, cause the processor to execute the following steps: installing a printer driver in the information processing device, wherein the printer driver is for providing configuration information for printing; retrieving modification information for the configuration information from a modification information storage unit, the modification information storage unit being a storage area that is different from a configuration information storage unit; storing, in the configuration information storage unit, the modification information retrieved by the step of retrieving; providing the configuration information using the script; and configuring, as a default value of the configuration information, the configuration information created by the step of providing using the modification information stored in the configuration information storage unit.

13 Claims, 25 Drawing Sheets

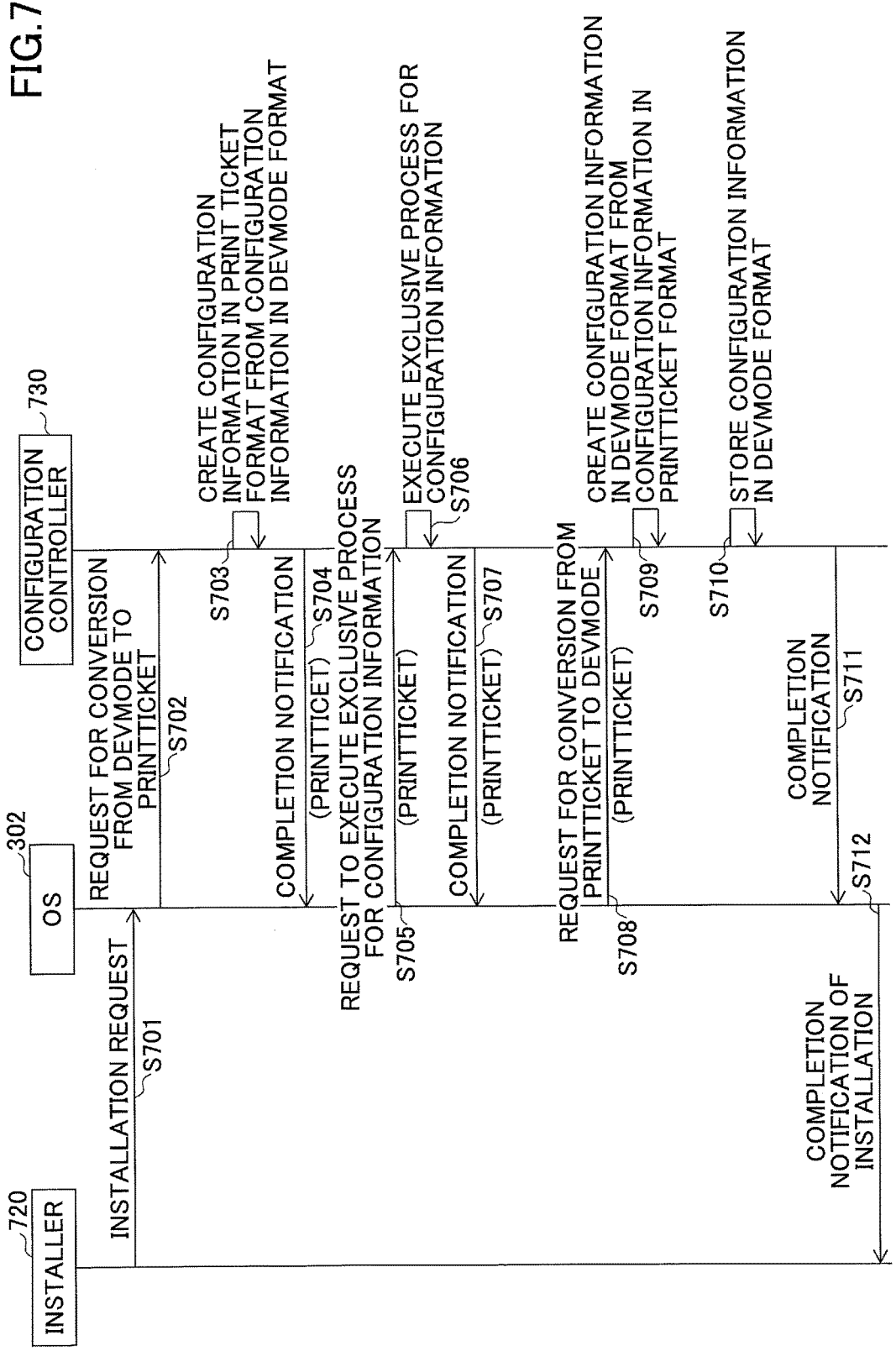

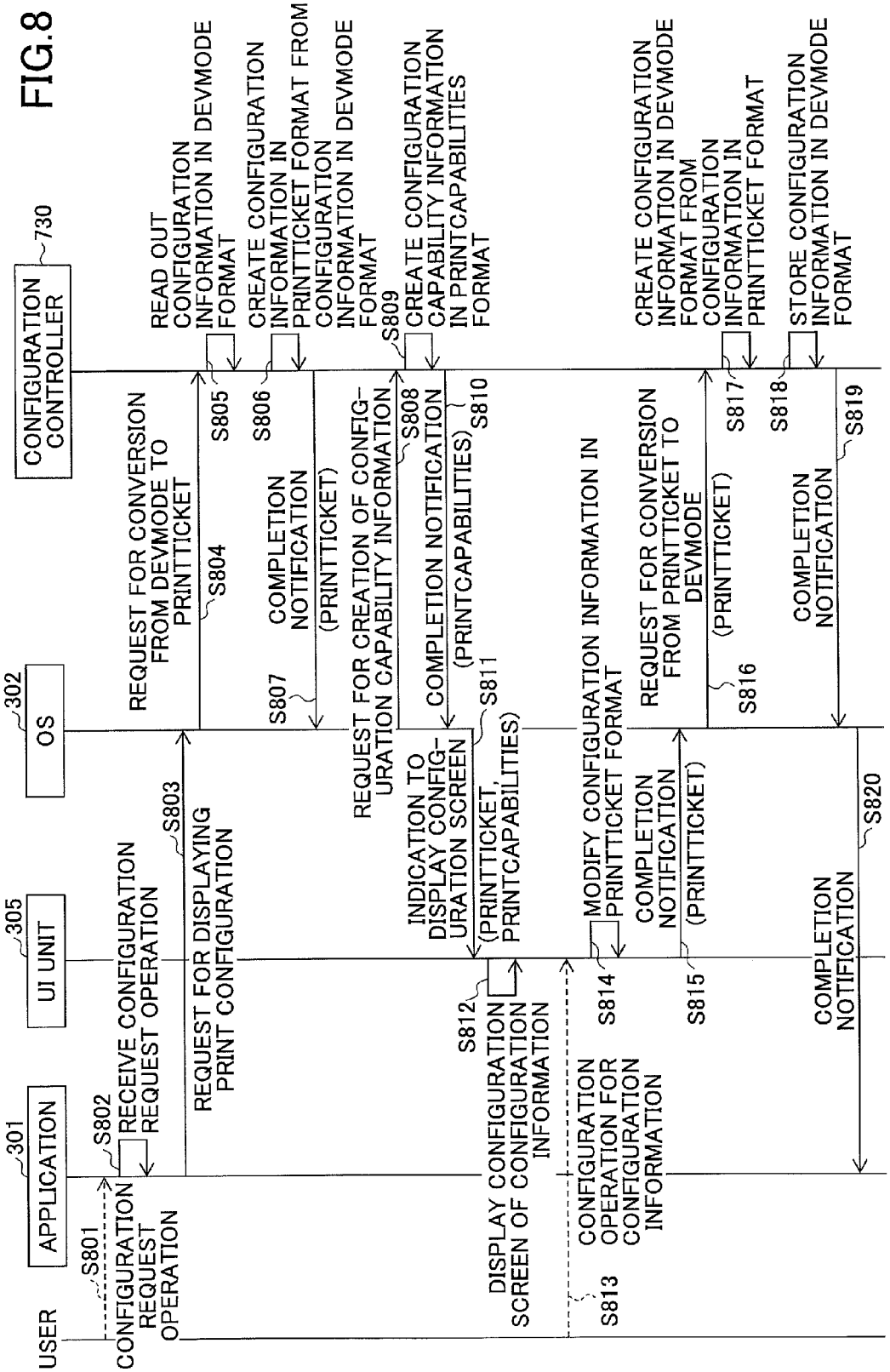

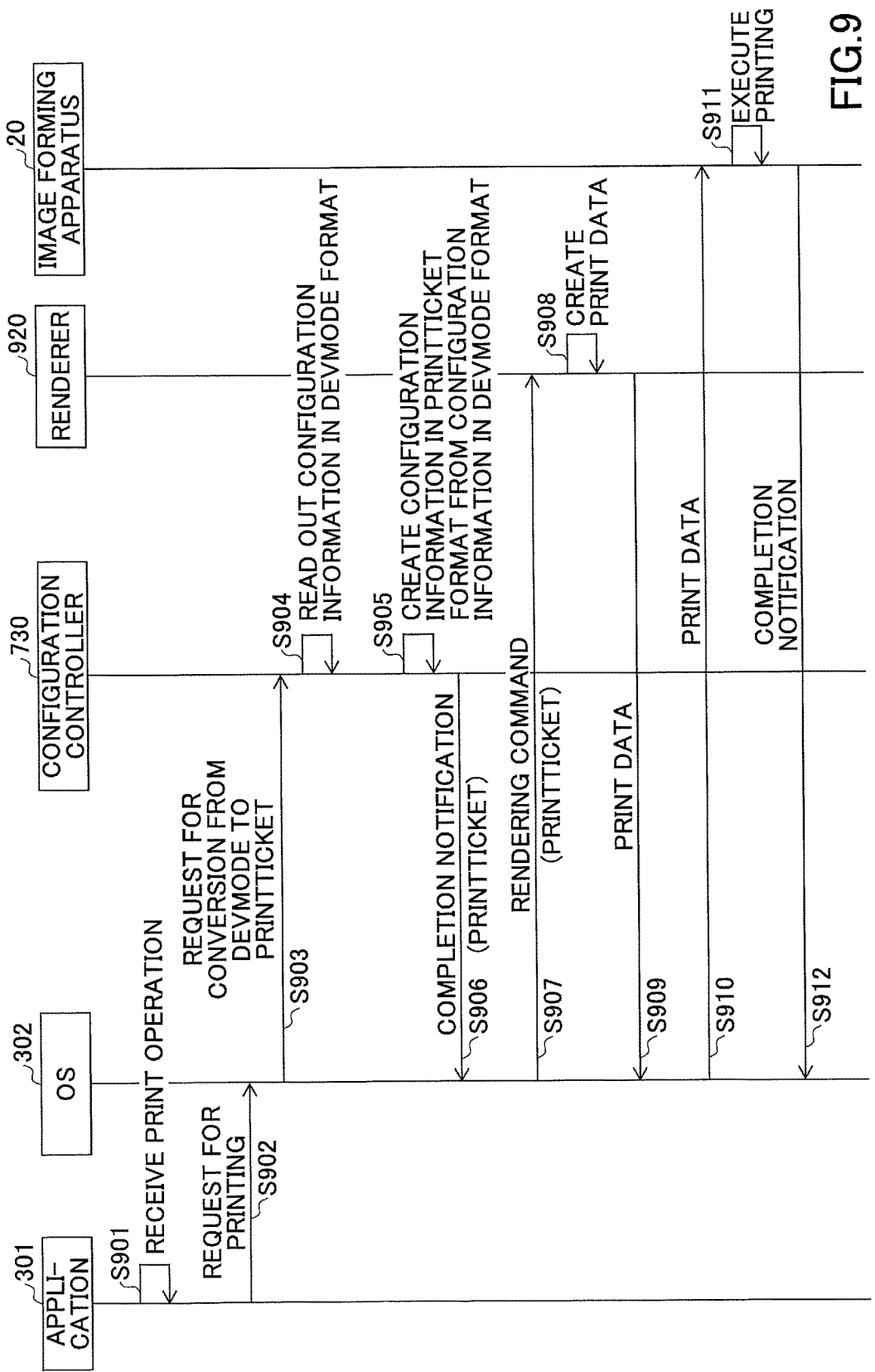

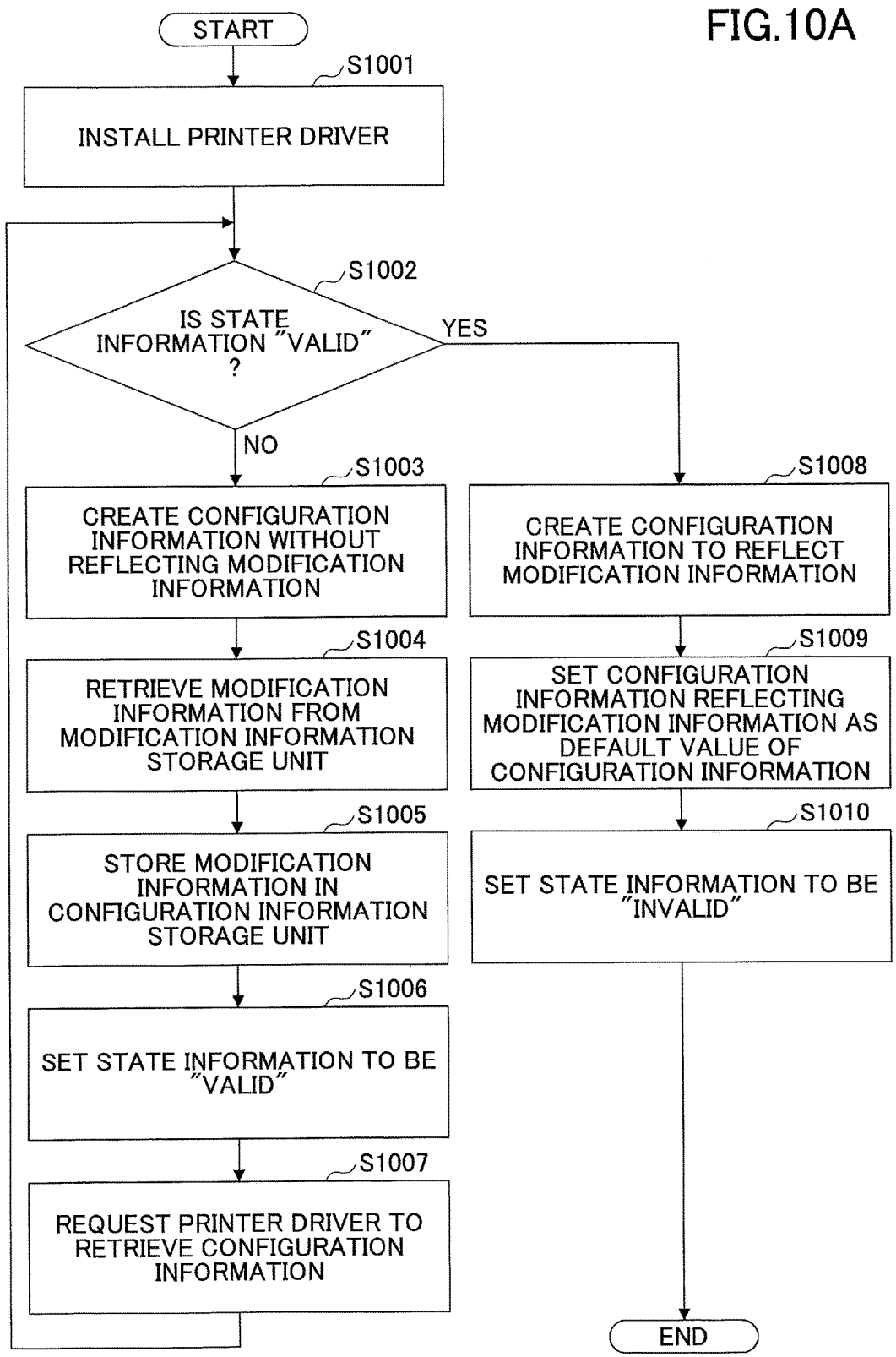

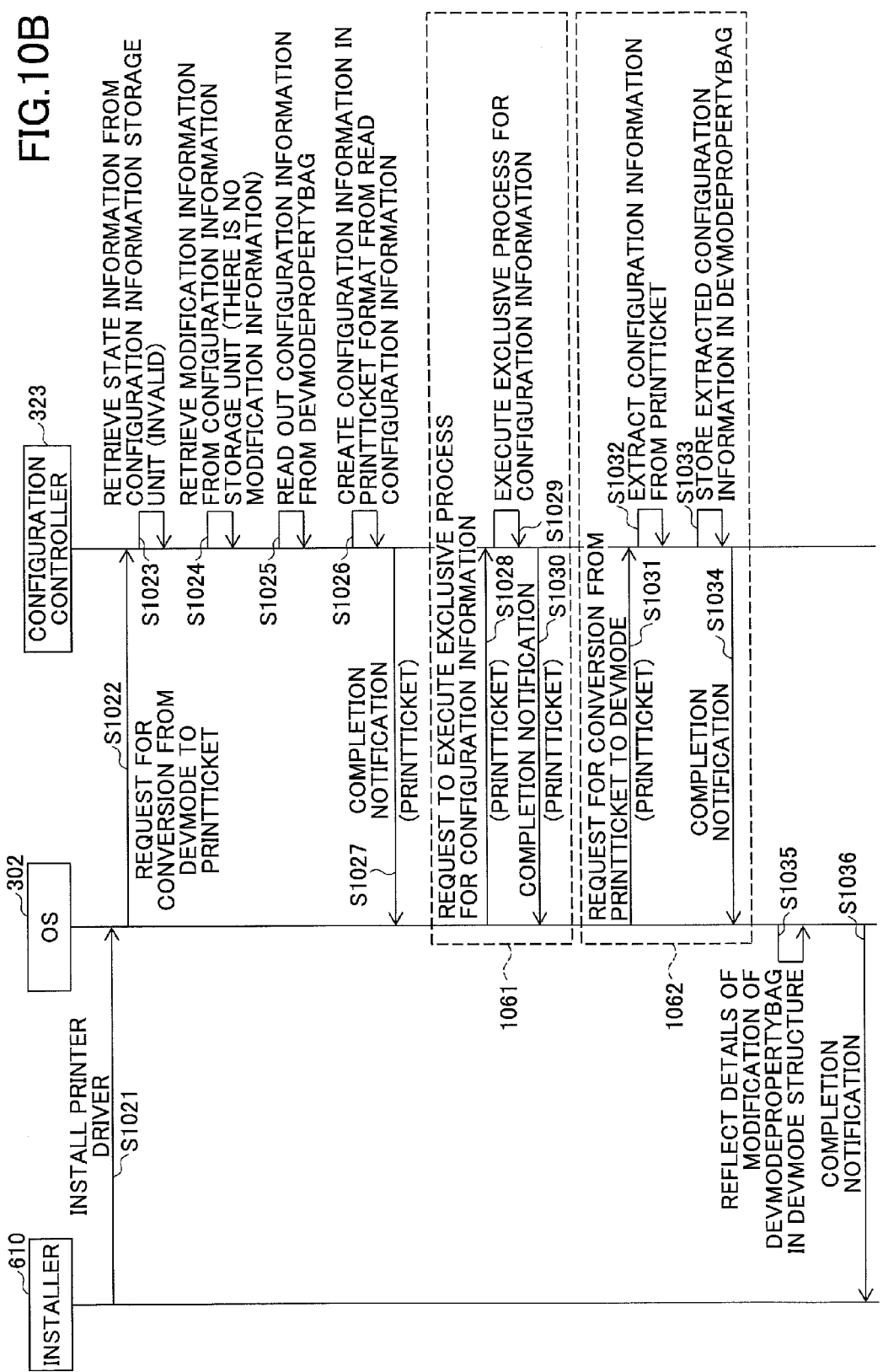

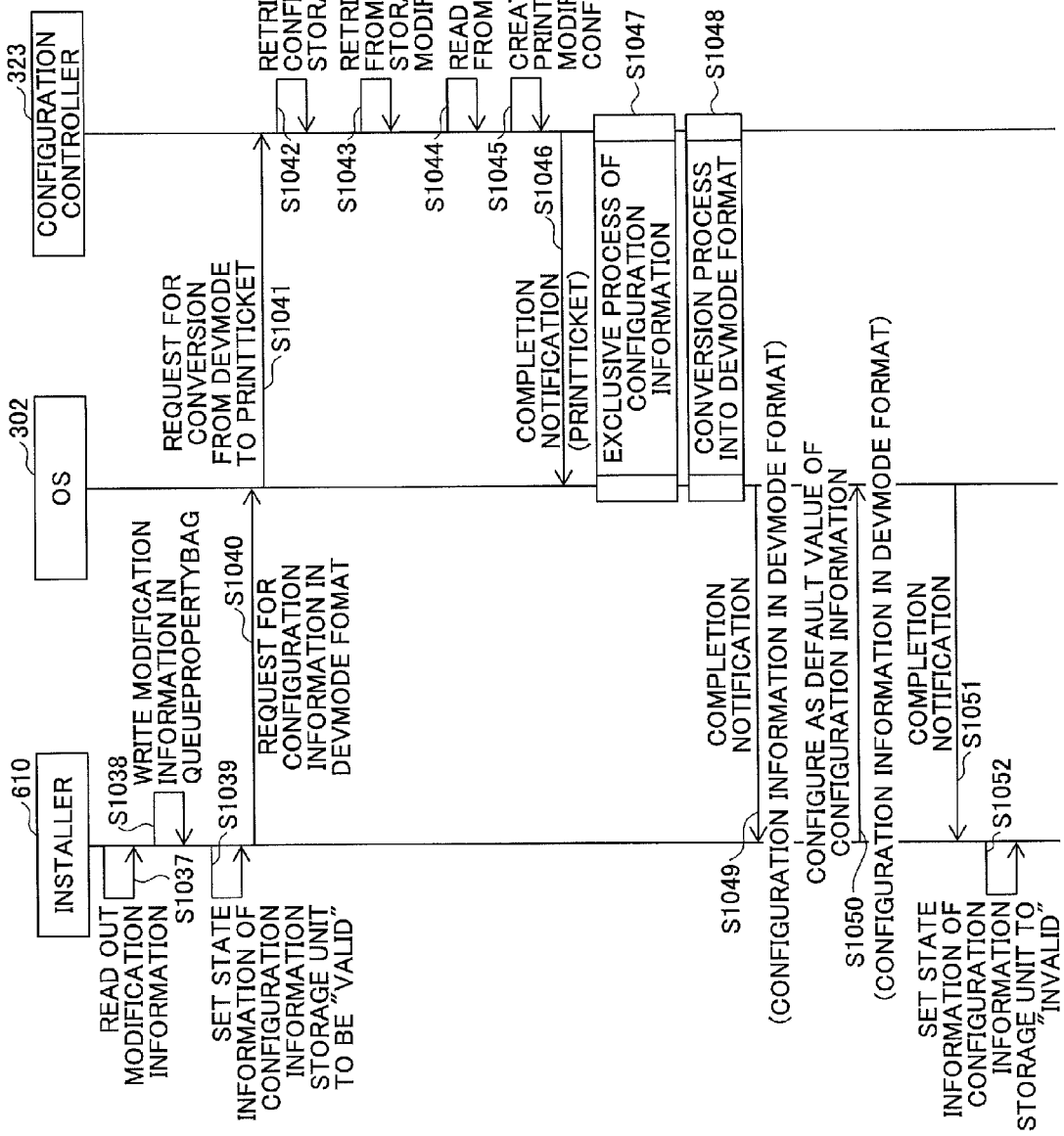

```
1101 ─ <psf:Feature name="psk:PageOutputColor">
         <psf:Option name="psk:Color"/>
       </psf:Feature>
1102 ─ <psf:Feature name="psk:PageMediaSize">
         <psf:Option name="psk:ISOA4">
           <psf:ScoredProperty name="psk:MediaSizeWidth">
             <psf:Value xsi:type="xsd:integer">210000</psf:Value>
           </psf:ScoredProperty>
           <psf:ScoredProperty name="psk:MediaSizeHeight">
             <psf:Value xsi:type="xsd:integer">297000</psf:Value>
           </psf:ScoredProperty>
         </psf:Option>
       </psf:Feature>
1103 ─ <psf:Feature name="psk:JobDuplexAllDocumentsContiguously">
         <psf:Option name="psk:None"/>
       </psf:Feature>
1104 ─ <psf:Feature name="psk:PageMediaType">
         <psf:Option name="psk:Plain"/>
       </psf:Feature>
1105 ─ <psf:Feature name="psk:JobNUpAllDocumentsContiguously">
         <psf:Option>
           <psf:ScoredProperty name="psk:PagesPerSheet">
             <psf:Value xsi:type="xsd:integer">1</psf:Value>
           </psf:ScoredProperty>
         </psf:Option>
       </psf:Feature>
```

```
<devicesettings>
  <item name="mediatype" default="special"/>
  <item name="duplex" hidden="yes"/>
</devicesettings>
<featurelock>
  <item name="colorbw" fixvalue="blackandwhite"/>
  <item name="layout">
    <pickone name="2pagespersheet"/>
    <pickone name="4pagespersheet"/>
  </item>
</featurelock>
```

1200

1201 — `<item name="mediatype" default="special"/>`
1202 — `<item name="duplex" hidden="yes"/>`
1203 — `<item name="colorbw" fixvalue="blackandwhite"/>`
1204 — `<item name="layout">`

```
[<psf:Feature name="psk:PageOutputColor">
    <psf:Option name="psk:Monochrome"/>
</psf:Feature>
<psf:Feature name="psk:PageMediaSize">
    <psf:Option name="psk:ISOA4">
        <psf:ScoredProperty name="psk:MediaSizeWidth">
            <psf:Value xsi:type="xsd:integer">210000</psf:Value>
        </psf:ScoredProperty>
        <psf:ScoredProperty name="psk:MediaSizeHeight">
            <psf:Value xsi:type="xsd:integer">297000</psf:Value>
        </psf:ScoredProperty>
    </psf:Option>
</psf:Feature>
<psf:Feature name="psk:PageMediaType">
    <psf:Option name="ns0000:Special"/>
</psf:Feature>
<psf:Feature name="psk:JobDuplexAllDocumentsContiguously">
    <psf:Option name="psk:None"/>
</psf:Feature>
<psf:Feature name="psk:JobNUpAllDocumentsContiguously">
    <psf:Option>
        <psf:ScoredProperty name="psk:PagesPerSheet">
            <psf:Value xsi:type="xsd:integer">2</psf:Value>
        </psf:ScoredProperty>
    </psf:Option>
</psf:Feature>
```

1301 — first Feature block (PageOutputColor)
1302 — PageMediaType Special option
1303 — JobNUpAllDocumentsContiguously block

FIG.13

```xml
1500
1501 ─── <psf:Feature name=" psk:JobNUpAllDocumentsContiguously">
       <psf:Property name=" psf:SelectionType">
         <psf:Value xsi:type=" xsd:QName">psk:PickOne</psf:Value>
       </psf:Property>
       <psf:Property name=" psk:DisplayName">
         <psf:Value xsi:type=" xsd:string">PAGE NUMBER PER SHEET</psf:Value>
       </psf:Property>
       <psf:Option>
1502 ───   <psf:ScoredProperty name=" psk:PagesPerSheet">
             <psf:Value xsi:type=" xsd:integer">1</psf:Value>
           </psf:ScoredProperty>
           <psf:Property name=" psk:DisplayName">
             <psf:Value xsi:type=" xsd:string">1</psf:Value>
           </psf:Property>
       </psf:Option>
       <psf:Option>
1503 ───   <psf:ScoredProperty name=" psk:PagesPerSheet">
             <psf:Value xsi:type=" xsd:integer">2</psf:Value>
           </psf:ScoredProperty>
           <psf:Property name=" psk:DisplayName">
             <psf:Value xsi:type=" xsd:string">2</psf:Value>
           </psf:Property>
       </psf:Option>
       <psf:Option>
1504 ───   <psf:ScoredProperty name=" psk:PagesPerSheet">
             <psf:Value xsi:type=" xsd:integer">4</psf:Value>
           </psf:ScoredProperty>
           <psf:Property name=" psk:DisplayName">
             <psf:Value xsi:type=" xsd:string">4</psf:Value>
           </psf:Property>
       </psf:Option>
       <psf:Option>
1505 ───   <psf:ScoredProperty name=" psk:PagesPerSheet">
             <psf:Value xsi:type=" xsd:integer">9</psf:Value>
           </psf:ScoredProperty>
           <psf:Property name=" psk:DisplayName">
             <psf:Value xsi:type=" xsd:string">9</psf:Value>
           </psf:Property>
       </psf:Option>
     </psf:Feature>
```

```
1501 — <psf:Feature name=" psk:JobNUpAllDocumentsContiguously">
        <psf:Property name=" psf:SelectionType">
            <psf:Value xsi:type=" xsd:QName">psk:PickOne</psf:Value>
        </psf:Property>
        <psf:Property name=" psk:DisplayName">
            <psf:Value xsi:type=" xsd:string">PAGE NUMBER PER SHEET</psf:Value>
        </psf:Property>
1503 —  <psf:Option>
            <psf:ScoredProperty name=" psk:PagesPerSheet">
                <psf:Value xsi:type=" xsd:integer">2</psf:Value>
            </psf:ScoredProperty>
            <psf:Property name=" psk:DisplayName">
                <psf:Value xsi:type=" xsd:string">2</psf:Value>
            </psf:Property>
        </psf:Option>
1504 —  <psf:Option>
            <psf:ScoredProperty name=" psk:PagesPerSheet">
                <psf:Value xsi:type=" xsd:integer">4</psf:Value>
            </psf:ScoredProperty>
            <psf:Property name=" psk:DisplayName">
                <psf:Value xsi:type=" xsd:string">4</psf:Value>
            </psf:Property>
        </psf:Option>
</psf:Feature>
```

1600

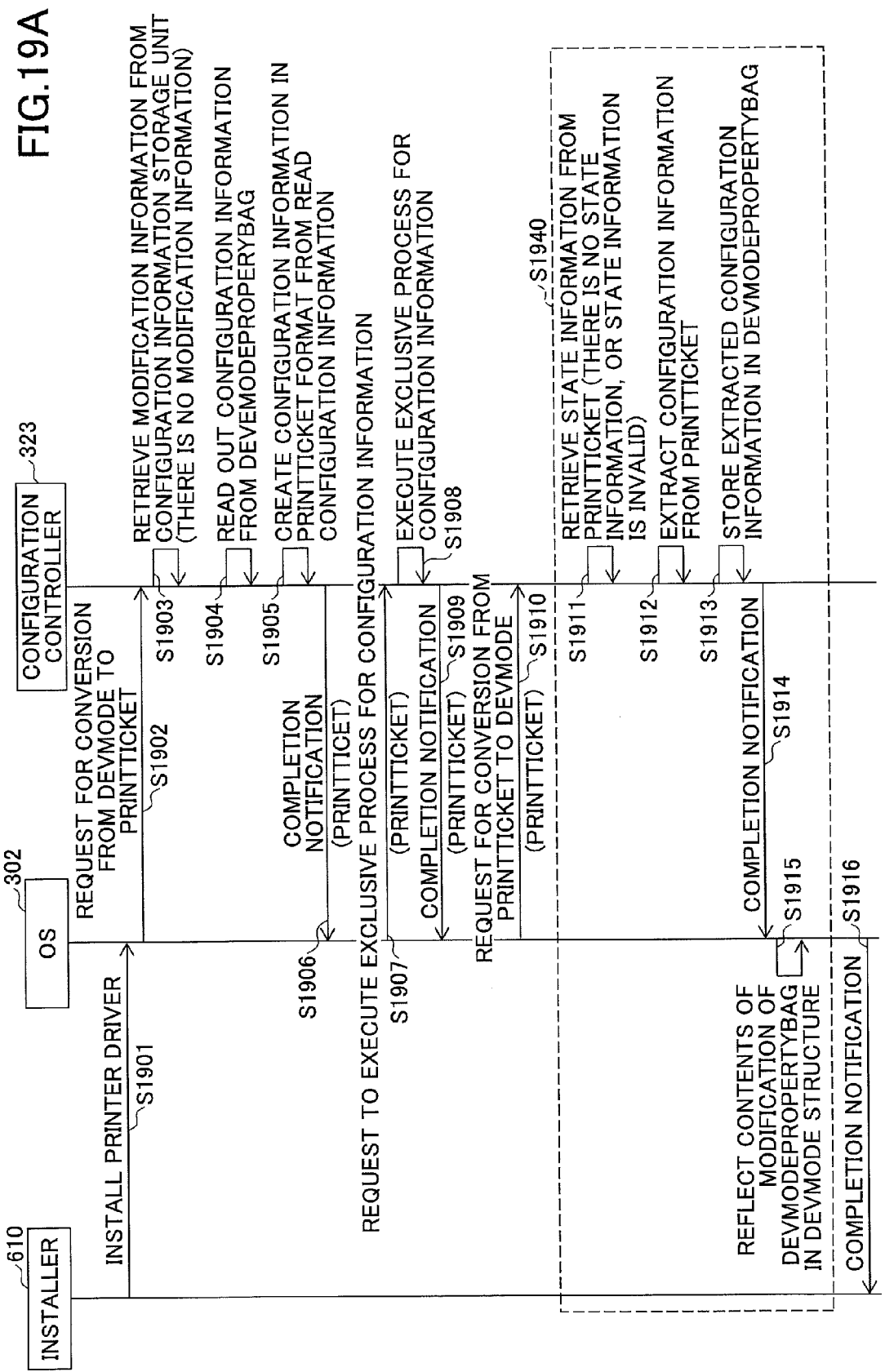

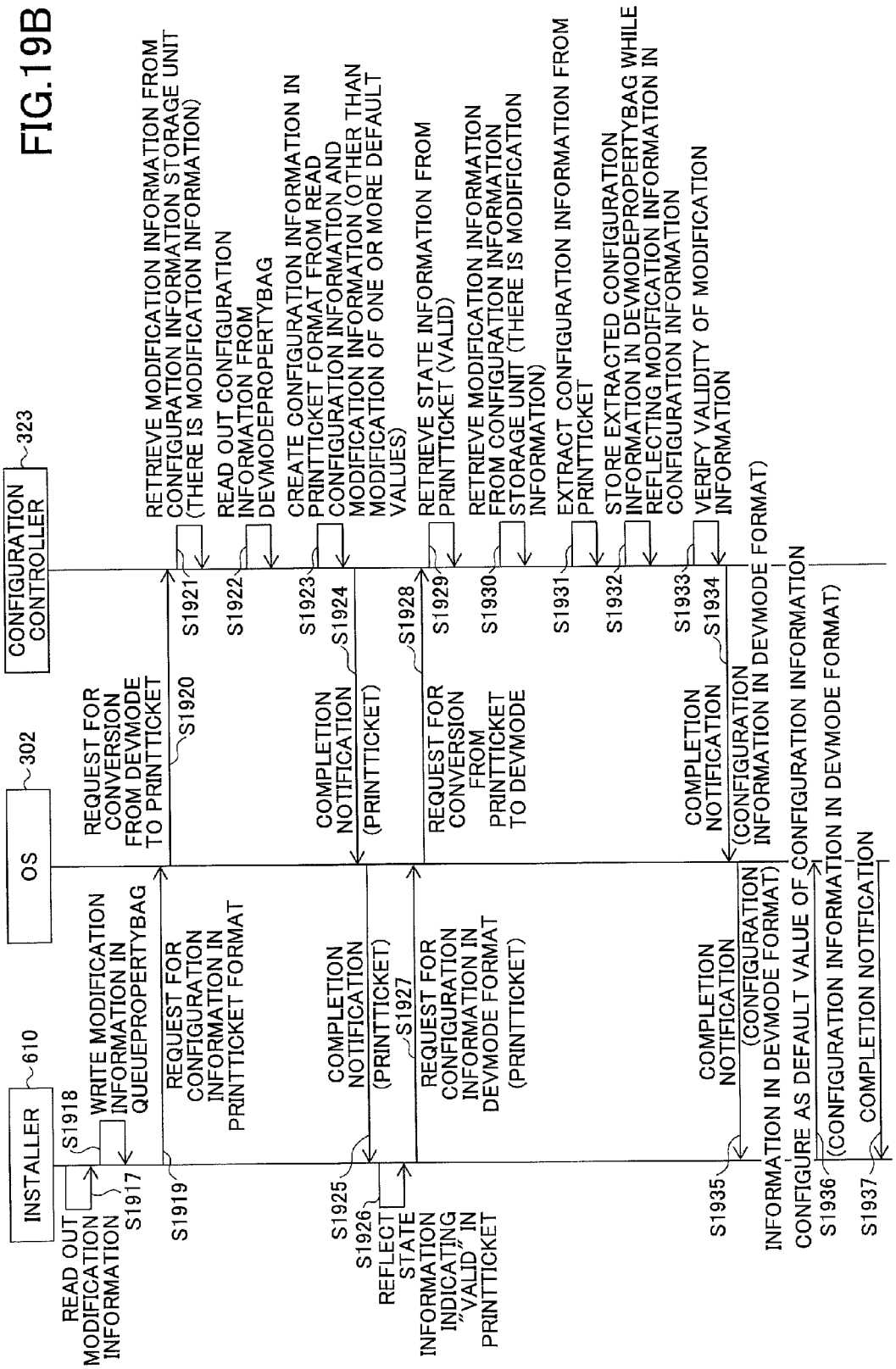

FIG.20

| | CONFIGURATION CONTROLLER | | | UI UNIT |
|---|---|---|---|---|
| | PRINTTICKET → DEVMODE CONVERSION, STATE INFORMATION IS VALID | PRINTTICKET → DEVMODE CONVERSION, STATE INFORMATION IS INVALID | CREATING PRINTCAPABILITIES | |
| MODIFICATION OF DEFAULT VALUE (DEFAULT OF DEVICESETTINGS) | O | – | – | – |
| NOT TO DISPLAY UI (DEVICESETTINGS ARE HIDDEN) | – | – | – | O |
| FIX CONFIGURED VALUE (FIXVALUE OF FEATURELOCK) | O | O | O | O |
| RESTRICT CONFIGURED VALUE (PICKONE OF FEATURELOCK) | O | O | O | O |

FIG.21

```
<?xml version="1.0" encoding="UTF-8"?>
<psf:PrintTicket
xmlns:psk="http://schemas.microsoft.com/windows/2003/08/printing/printschemakeywords"
xmlns:ns0000="http://schemas.ricoh.com/2007/printing/keywords"      version="1"
xmlns:xsd="http://www.w3.org/2001/XMLSchema"
xmlns:xsi="http://www.w3.org/2001/XMLSchema-instance"
xmlns:psf="http://schemas.microsoft.com/windows/2003/08/printing/printschemaframework">
<psf:ParameterInit name="psk:JobCopiesAllDocuments">
  <psf:Value xsi:type="xsd:integer">1</psf:Value>
</psf:ParameterInit>
<psf:Feature name="psk:PageMediaSize">
  <psf:Option name="psk:ISOA4">
    <psf:ScoredProperty name="psk:MediaSizeWidth">
      <psf:Value xsi:type="xsd:integer">210000</psf:Value>
    </psf:ScoredProperty>
    <psf:ScoredProperty name="psk:MediaSizeHeight">
      <psf:Value xsi:type="xsd:integer">297000</psf:Value>
    </psf:ScoredProperty>
  </psf:Option>
</psf:Feature>
<psf:Feature name="psk:PageInputBin">
  <psf:Option name="ns0000:BypassTray"/>
</psf:Feature>
<psf:Feature name="psk:PageMediaType">
  <psf:Option name="ns0000:Standard_Recycled"/>
</psf:Feature>
<psf:Feature name="psk:PageOrientation">
  <psf:Option name="psk:Portrait"/>
</psf:Feature>
<psf:Feature name="ns0000:JobCustomSettingFlag">        ⎫
          <psf:Option name="ns0000:On"/>                ⎬ 2101
</psf:Feature>                                          ⎭
</psf:PrintTicket>
```

INFORMATION PROCESSING DEVICE, INFORMATION PROCESSING SYSTEM, AND INFORMATION PROCESSING METHOD

BACKGROUND OF THE INVENTION

1. Field of the Invention

The present disclosure relates to an information processing device, an information processing system, and an information processing method.

2. Description of the Related Art

For Windows Operating Systems (OS) from Windows (registered trademark) 2000 up to Windows 7, an architecture of a printer driver has been adopted, which is referred to as Version 3 (which is denoted as "V3," hereinafter). For Windows OS on and after Windows 8, in addition to the V3 printer driver, a new printer driver architecture has been adopted, which is referred to as Version 4 (which is denoted as "V4," hereinafter).

Furthermore, among the V3 printer drivers, a printer driver has been known that determines whether configuration data is stored in a predetermined storage area, and, upon determining that the configuration data is stored in the predetermined storage area, the printer driver updates a print configuration so that the configuration data is reflected in the print configuration (cf. Patent Document 1 (Japanese Unexamined Patent Publication No. 2013-190897), for example).

A V3 printer driver can read configuration data stored in a predetermined storage area. For example, during installation, configuration data stored in a predetermined storage area can be reflected in one or more default values of the configuration information of the V3 printer driver.

A V4 printer driver manages configuration information using a script for managing the configuration information of the V4 printer driver. However, the script is incapable of reading configuration data stored in an external storage area that is different from an area managed by the V4 printer driver. Thus, with a V4 printer driver, it is difficult to read, during installation, configuration data stored in an external storage area to update default values of configuration information of the printer driver, so that the configuration data is reflected in the default values of the configuration information of the printer driver.

It is desirable that, during installation of a V4 printer driver, modification information stored in an external storage area can be easily reflected in one or more default values of configuration information of the V4 printer driver.

SUMMARY OF THE INVENTION

According to an aspect of the present disclosure, there is provided an information processing device for controlling printing, the information processing device including a processor; and a memory that stores instructions, which when executed, cause the processor to execute the following steps: installing a printer driver in the information processing device, wherein the printer driver is for providing configuration information for printing using a script that controls the configuration information for printing; retrieving modification information for the configuration information from a modification information storage unit, the modification information storage unit being a storage area that is different from a configuration information storage unit that is another storage area that can be used by the script; storing, in the configuration information storage unit, the modification information retrieved by the step of retrieving; providing the configuration information using the script; and configuring, as a default value of the configuration information, the configuration information created by the step of providing using the modification information stored in the configuration information storage unit.

According to another aspect of the present disclosure, there is provided an information processing system including an information processing device that control printing; and an image forming apparatus that executes printing in accordance with the control of the information processing device, wherein the information processing device includes a processor; and a memory that stores instructions, which when executed, causes the processor to execute the following steps: installing a printer driver in the information processing device, wherein the printer driver is for providing configuration information for printing using a script that controls the configuration information for printing; retrieving modification information for the configuration information from a modification information storage unit, the modification information storage unit being a storage area that is different from a configuration information storage unit that is another storage area that can be used by the script; storing, in the configuration information storage unit, the modification information retrieved by the step of retrieving; providing the configuration information using the script; and configuring, as a default value of the configuration information, the configuration information created by the step of providing using the modification information stored in the configuration information storage unit.

According to another aspect of the present disclosure, there is provided an information processing method executed by an information processing device for controlling printing, the information processing method including installing a printer driver in the information processing device, wherein the printer driver is for providing configuration information for printing using a script that controls the configuration information for printing; retrieving modification information for the configuration information from a modification information storage unit, the modification information storage unit being a storage area that is different from a configuration information storage unit that is another storage area that can be used by the script; storing, in the configuration information storage unit, the modification information retrieved by the step of retrieving; providing the configuration information using the script; and configuring, as a default value of the configuration information, the configuration information created by the step of providing using the modification information stored in the configuration information storage unit.

According to an embodiment of the present disclosure, during installation of a V4 printer driver, modification information stored in an external storage area can be easily reflected in default values of configuration information of the V4 printer driver.

Other objects, features and advantages of the present disclosure will become more apparent from the following detailed description when read in conjunction with the accompanying drawings.

BRIEF DESCRIPTION OF THE DRAWINGS

FIG. 7 is a sequence diagram illustrating an example of an installation process of a V4 printer according to the embodiment;

FIG. 8 is a sequence diagram illustrating an example of a configuration process of configuration information in the V4 printer driver according to the embodiment;

FIG. 9 is a sequence diagram illustrating an outline of a print process by the V4 printer driver according to the embodiment;

FIG. 10A is a flowchart illustrating an example of an installation process of a printer driver according to a first example;

FIG. 10B is a sequence diagram illustrating an example of the installation process of the printer driver according to the first example;

FIG. 10C is a sequence diagram illustrating a continuation of the example of the installation process of the printer driver according to the first example;

FIG. 11 is a diagram illustrating an example of the configuration information according to the first example prior to modification;

FIG. 12 is a diagram illustrating an example of modification information according to the first example;

FIG. 13 is a diagram illustrating an example of the updated configuration information according to the first example, which reflects the modification information;

FIG. 15 is a diagram illustrating an example of configuration capability information according to the embodiment prior to modification;

FIG. 16 is a diagram illustrating an example of the configuration capability information according to the embodiment, which reflects the modification information;

FIG. 19A is a sequence diagram illustrating an example of an installation process of a printer driver according to the third example;

FIG. 19B is a sequence diagram illustrating a continuation of the example of the installation process of the printer driver according to the third example;

FIG. 20 is a diagram illustrating types of modification information according to the embodiment;

FIG. 21 is a diagram illustrating an example of Print-Ticket according to the third example.

DETAILED DESCRIPTION OF THE PREFERRED EMBODIMENTS

In the following, embodiments of the present disclosure are described in detail by referring to the accompanying drawings.

<System Configuration>

Figure 1:
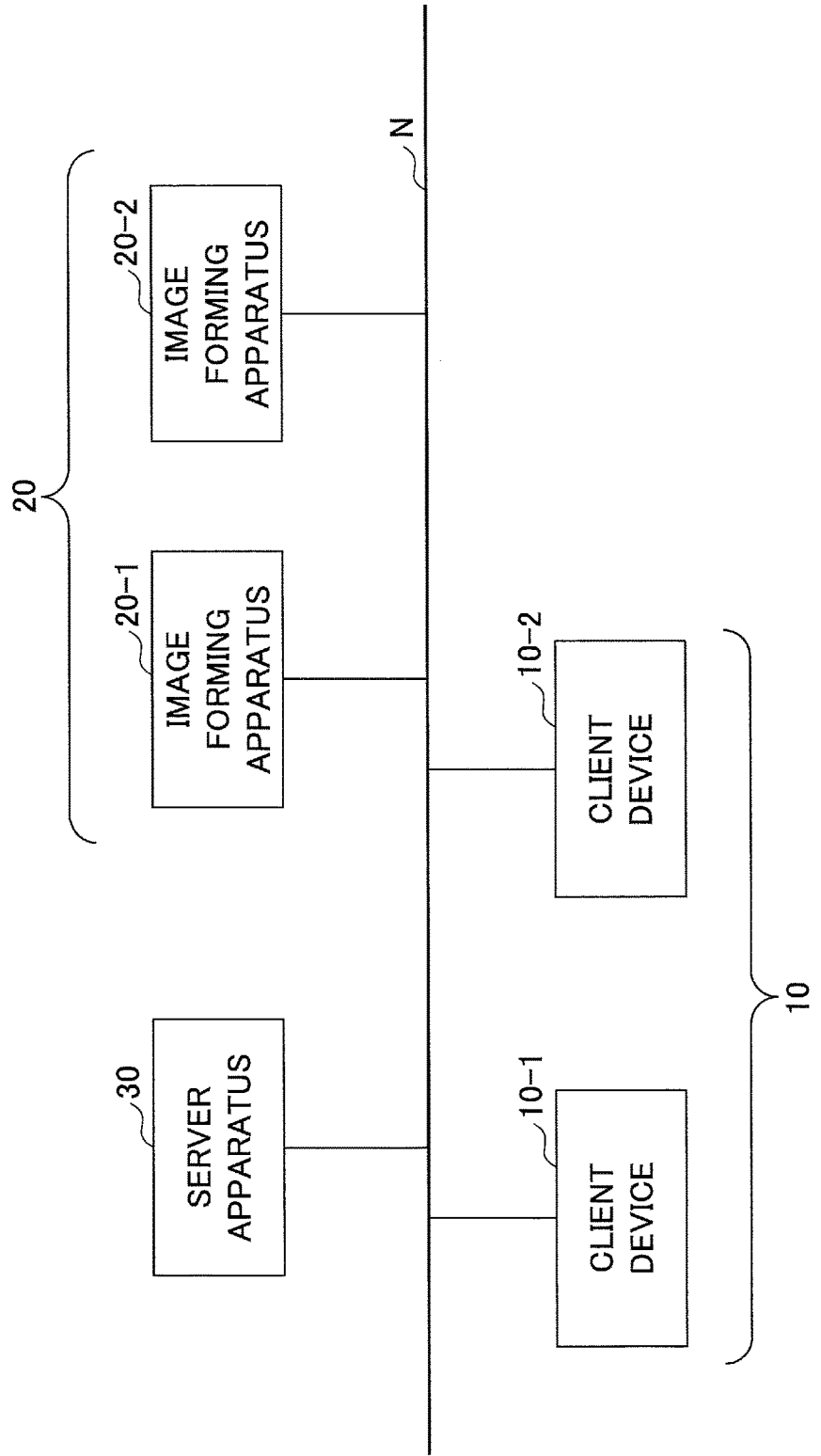
FIG. 1 is a diagram illustrating a system configuration of an example of an information processing system according to an embodiment.

First, a system configuration of an information processing system 1 according to an embodiment is described by referring to FIG. 1. FIG. 1 is a diagram illustrating a system configuration of an example of the information processing system 1 according to the embodiment.

As illustrated in FIG. 1, the information processing system 1 according to the embodiment includes one or more client devices 10; one or more image forming apparatuses 20; and a server apparatus 30. These devices are coupled to each other through a network N, such as a local area network (LAN), so that these devices can communicate each other.

The client device 10 may be, for example, a personal computer (PC), a smartphone, or a tablet terminal. Upon receiving, for example, a print command from a user, the client device 10 creates print data from data to be printed, and the client device 10 transmits the print data to the image forming apparatus 20. Alternatively, upon receiving, for example, a print command from a user, the client device 10 transmits data to be printed to the server apparatus 30.

Note that the data to be printed is, for example, printable electronic data, such as image data and document data. Furthermore, the print data is, for example, electronic data obtained by converting the data to be printed into data in a Page Description Language (PDL) format that can be printed by the image forming apparatus 20.

The image forming apparatus 20 is, for example, a printer or a Multifunction Peripheral (MFP) with a printing function. The image forming apparatus 20 prints the print data received from the client device 10 or the server apparatus 30.

The server apparatus 30 is, for example, a personal computer (PC). For example, the server apparatus 30 creates print data from data to be printed received from the client device 10, and the server apparatus 30 transmits the created print data to the image forming apparatus 20.

The server apparatus 30 may also function as a file server. Namely, the server apparatus 30 may store, for example, print data received from the client device 10, and, upon receiving a request from the image forming apparatus 20, the server apparatus 30 may transmit the stored print data to the requesting image forming apparatus 20.

Note that, in the following descriptions, when the one or more client devices 10 are to be distinguished from each other, the one or more client devices 10 may be denoted as "client device 10-1" and "client device 10-2," for example. Similarly, when the one or more image forming apparatuses 20 are to be distinguished from each other, the one or more image forming apparatuses 20 may be denoted as "image forming apparatus 20-1" and "image forming apparatus 20-2," for example.

<Hardware Configuration>

Figure 2:
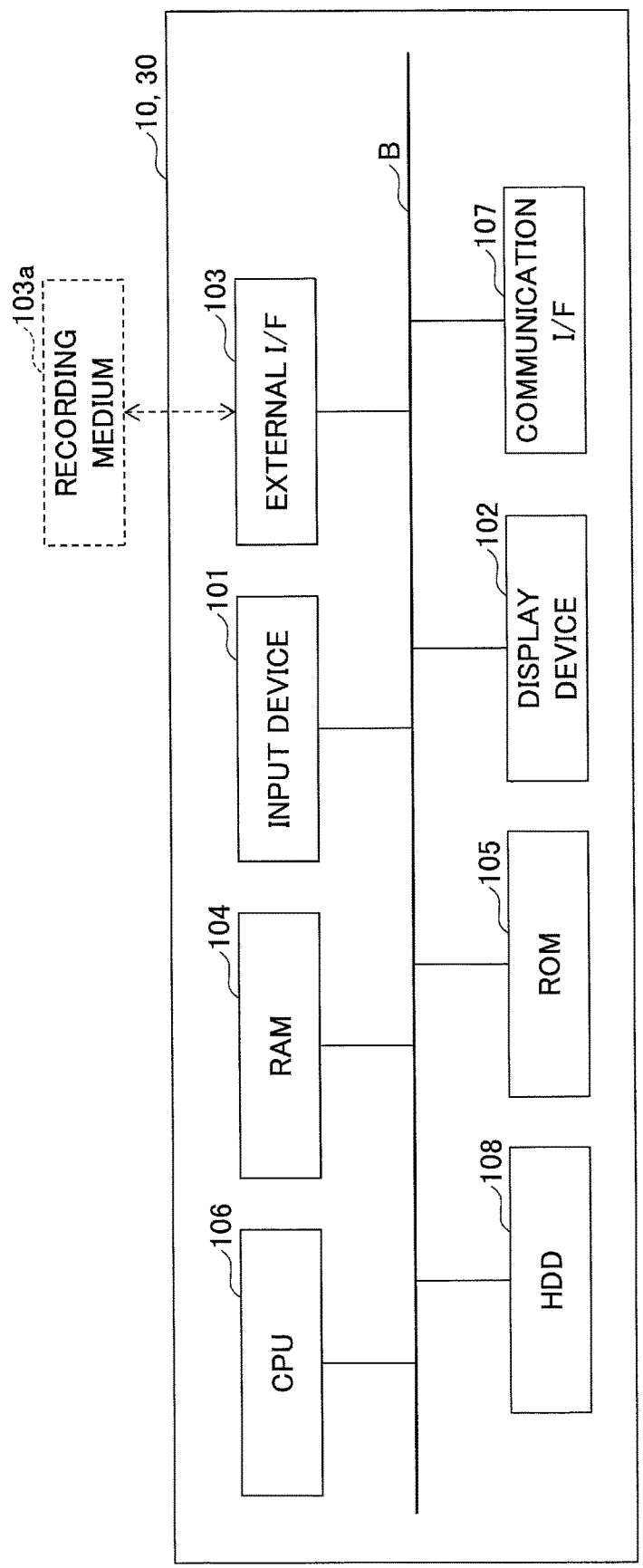
FIG. 2 is a diagram illustrating a hardware configuration of an example of each of a client device and a server apparatus according to the embodiment.
Figure 3:
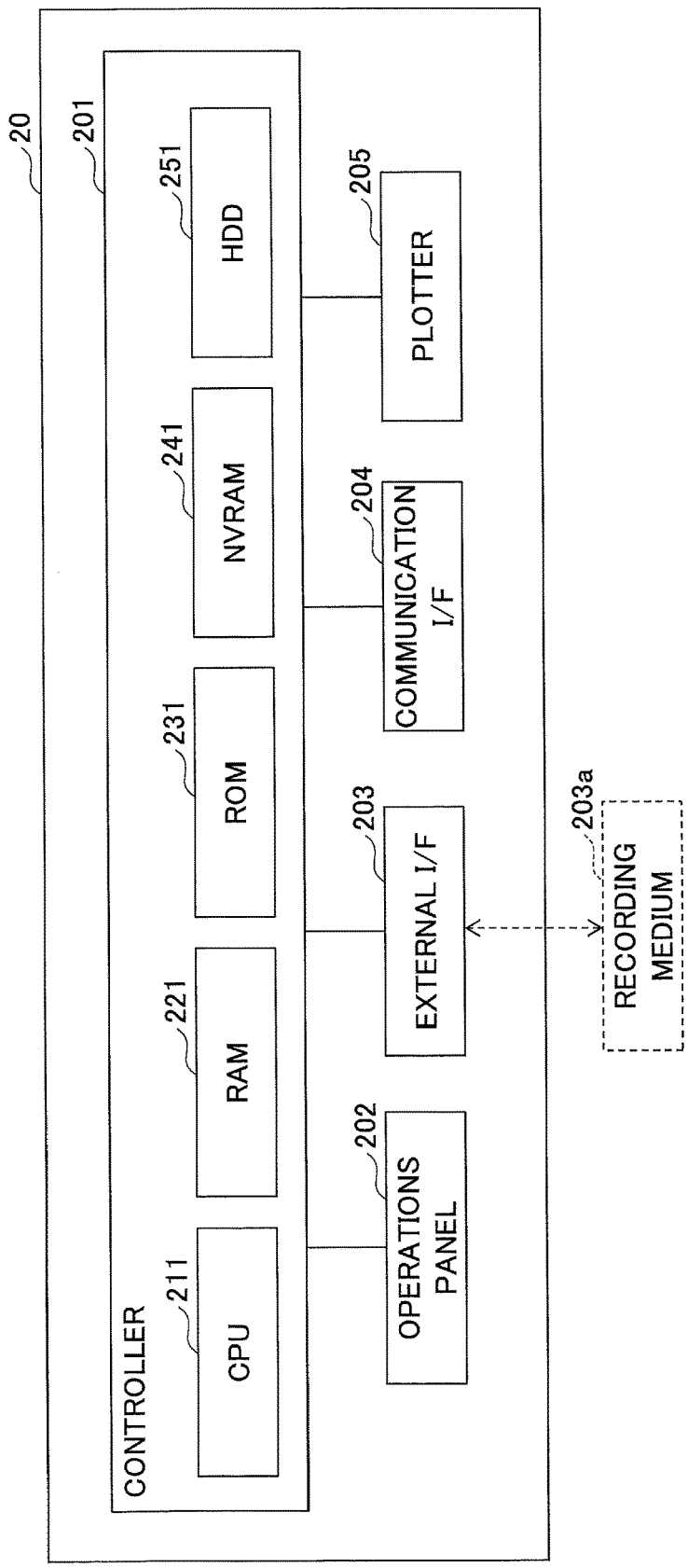
FIG. 3 is a diagram illustrating a hardware configuration of an example of an image forming apparatus according to the embodiment.

Next, hardware configurations of the client device 10, the image forming apparatus 20, and the server apparatus 30 that are included in the information processing system 1 according to the embodiment are described by referring to FIG. 2 and FIG. 3.

<<The Client Device 10 and the Server Apparatus 30>>

FIG. 2 is a diagram illustrating hardware configurations of examples of the client device 10 and the server apparatus 30 according to the embodiment. Note that the client device 10 and the server apparatus 30 have similar hardware configurations. Thus, in the following, the hardware configuration of the client device 10 is described.

As illustrated in FIG. 2, the client device 10 according to the embodiment includes an input device 101; a display device 102; an external I/F 103; and a Random Access Memory (RAM) 104. Furthermore, the client device 10 includes a Read Only Memory (ROM) 105; a Central Processing Unit (CPU) 106; a communication I/F 107; and a Hard Disk Drive (HDD) 108. These hardware components are coupled to each other through a bus B.

The input device 101 includes a keyboard, a mouse, and a touch panel; and the input device 101 is used by a user to input various operation signals. The display device 102 includes a display. The display device 102 displays a processing result by the client device 10. Note that at least one of the input device 101 and the display device 102 may be configured such that it is coupled to the client device 10 so as to be used when it is necessary.

The communication I/F 107 is an interface for coupling the client device 10 to the network N. The client device 10 can perform communication through the communication I/F 107.

The HDD 108 is a non-volatile storage device for storing a program and data. As the program and the data stored in the HDD 108, there are an Operating System (OS) that is a system software for controlling the entire client device 10 and an application software that provides various types of functions on the OS.

Note that, instead of the HDD 108, the client device 10 may include a drive device (e.g., a solid state drive (SSD)) that uses a flash memory as the storage medium. Furthermore, the HDD 108 manages the stored program and data by a predetermined file system or a database (DB).

The external I/F 103 is an interface with an external device. The external device includes a recording medium 103a. The client device 10 can read data from and write data in the recording medium 103a through the external I/F 103. Examples of the recording medium 103a include a flexible disk, a Compact Disk (CD), a Digital Versatile Disk (DVD), a SD memory card, and a Universal Serial Bus (USB) memory.

The ROM 105 is a non-volatile semiconductor memory that can maintain a program and data, even if a power source is turned off. The ROM 105 stores an OS setting; a program and data, such as network setting; and a Basic Input/Output System (BIOS) that is executed for activating the client device 10. The RAM 104 is a volatile semiconductor memory for temporarily storing a program and data.

The CPU 106 is a processor that performs control of the entire client device 10 and that implements other functions of the client device 10 by reading out a program and data from a storage device, such as the ROM 105 and the HDD 108, onto the RAM 104, and executing a process based on the program and the data.

Each of the client device 10 and the server apparatus 30 according to the embodiment is provided with the hardware configuration illustrated in FIG. 2, so that various types of processes, which are described below, can be implemented.

<<The Image Forming Apparatus 20>>

FIG. 3 is a diagram illustrating a hardware configuration of an example of the image forming apparatus 20 according to the embodiment.

As illustrated in FIG. 3, the image forming apparatus 20 according to the embodiment includes a controller 201; an operations panel 202; an external interface (I/F) 203; a communication I/F 204; and a plotter 205. Furthermore, the controller 201 includes a Central Processing Unit (CPU) 211; a Random-Access Memory (RAM) 221; a Read-Only Memory (ROM) 231; a Non-Volatile RAM (NVRAM) 241; and a Hard Disk Drive (HDD) 251.

The ROM 231 is a non-volatile semiconductor memory storing various types of programs and data. The RAM 221 is a volatile semiconductor memory that temporarily stores a program and data. The NVRAM 241 stores, for example, configuration information. Furthermore, the HDD 251 is a non-volatile storage device that stores various types of programs and data.

The CPU 211 is a processor that implements overall control and other functions of the image forming apparatus 20 by reading out a program, data, configuration information, etc., from the ROM 231, the NVRAM 241, and/or the HDD 251 onto the RAM 221 and executing a process based on the program and the data.

The operations panel 202 includes an input unit that receives an input from a user and a display unit that performs display. The external I/F 203 is an interface with an external device. As an example of the external device, there is a recording medium 203a. The image forming apparatus 20 is capable of performing reading out data from and writing data in the recording medium 203a through the external I/F 203. Examples of the recording medium 203a include an IC card, a flexible disk, a Compact Disk (CD), a Digital Versatile Disk (DVD), a Secure Digital (SD) memory card, a Universal Serial Bus (USB) memory, etc.

The communication I/F 204 is an interface for coupling the image forming apparatus 20 to a network N. The image forming apparatus 20 is capable of communicating through the communication I/F 204. The plotter 205 is a printer for printing print data.

The image forming apparatus 20 according to the embodiment is provided with a hardware configuration illustrated in FIG. 3, so that the image forming apparatus 20 is capable of executing various types of processes described below.

<Software Configuration of the Client Device 10>

Figure 4:
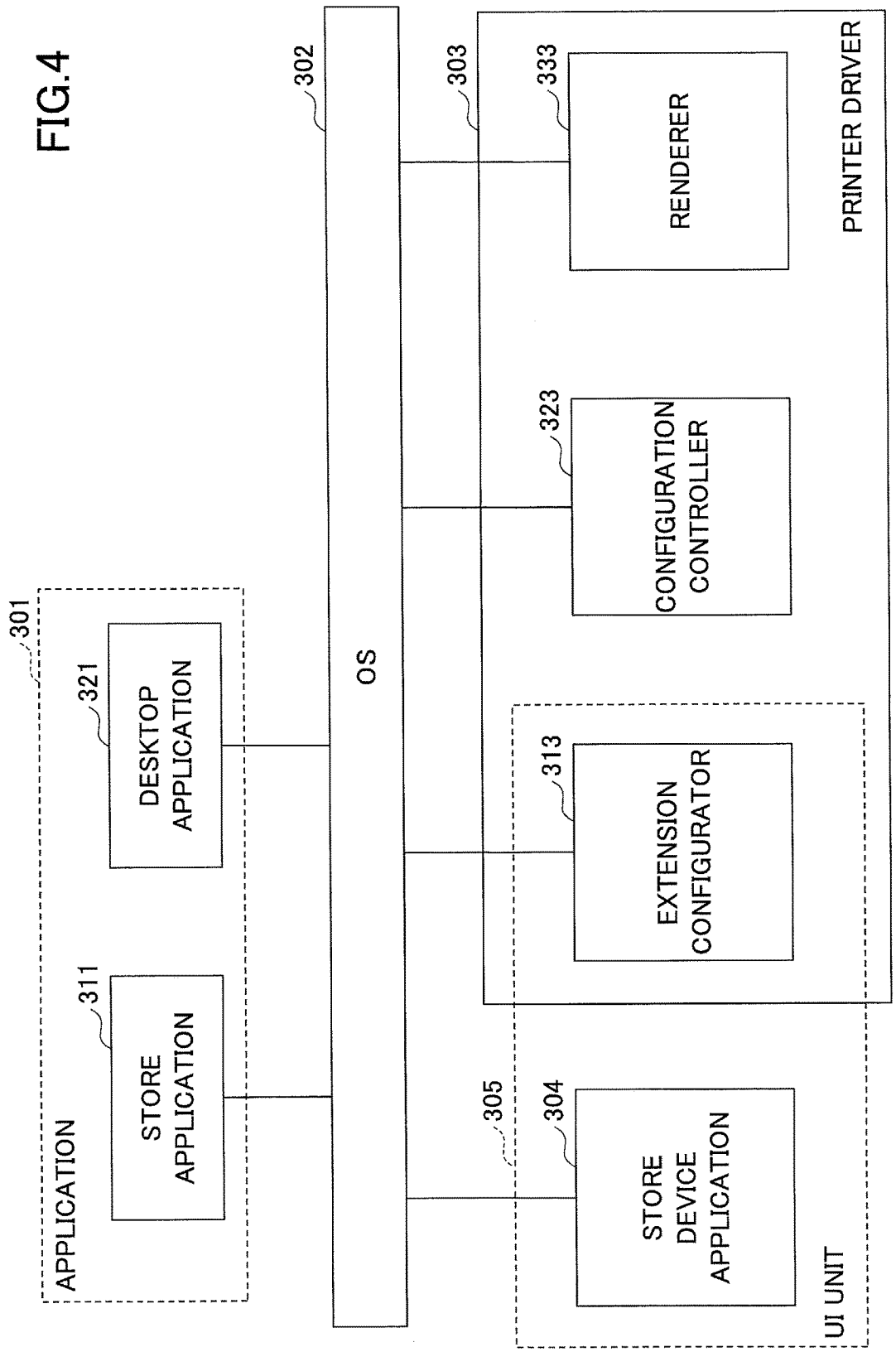
FIG. 4 is a diagram illustrating a software configuration of an example of the client device.

In the following, the software configuration of the client device 10 according to the embodiment is described by referring to FIG. 4. FIG. 4 is a diagram illustrating a software configuration of an example of the client device 10.

As illustrated in FIG. 4, the client device 10 according to the embodiment includes an application 301; an Operating System (OS) 302; a printer driver 303; a store device application 304.

The application 301 is application software, such as document creation software, image browsing/editing software, a browser, that is capable of indicating the OS 302 to print, in response to receiving a print command from a user. The application 301 includes a store application 311 and a desktop application 321.

The store application 311 is, for example, an application that is available from "Windows Store" that provides applications to Windows (registered trademark) 8/Windows RT and Windows OSs on and subsequent to Windows 8/Windows RT. In the store application 311, a store application User Interface (UI) is used. Note that, in Windows 8 and Windows 8.1, the store application 311 is invoked through a UI provided by the OS 302, which is referred to as "Modern UI" or "Metro UI."

The desktop application 321 is, for example, an application that can be used with an Windows OS on and prior to Windows 7.

The OS 302 is one of Windows 8/Windows RT and Windows OSs on and subsequent to Windows 8/Windows RT.

The printer driver 303 is, for example, a Version 4 printer driver (which is denoted as "V4 printer driver," hereinafter). A V4 printer driver is based on an architecture adopted from Windows 8/Windows RT. In the following, the printer driver 303 may also be denoted as "V4 printer driver 303."

Note that, in Windows OS on and after Windows 8, the V4 printer driver can be used, in addition to the Version 3 printer driver (which is denoted as "V3 printer driver," hereinafter), which has been used from Windows 2000 through Windows 7.

The printer driver 303 includes an extension configurator 313; a configuration controller 323; and a renderer 333.

The extension configurator 313 may also be referred to as a printer extension. In response to detecting that the desktop application 321 executes printing, the extension configurator 313 displays a print configuration screen specific to a vendor.

The configuration controller 323 may also be referred to as a line-breaking script. For example, the configuration controller 323 verifies whether a combination of print configurations is valid. For example, the extension configurator 313 may hide a combination of print configurations that are unverified by the configuration controller 323.

In response to receiving a request from the application 301 or the OS 302, the configuration controller 323 returns PrintCapability that indicates information about a function that can be configured by the printer driver 303. Furthermore, in response to receiving a request from the application 301 or the OS 302, the configuration controller 323 retrieves, from DevmodePropertyBag, configuration values of respective functions configured in the printer driver 303, and the configuration controller 323 returns PrintTicket indicating the retrieved configuration values. Additionally, the configuration controller 323 stores the configuration values indicated by PrintTicket in DevmodePropertyBag.

Note that PrintCapability and PrintTicket returned to the OS 302 are used, for example, for displaying current values of respective functions and options in the print configuration screen displayed by the extension configurator 313.

In response to detecting, by the application 301, that a print command for printing the data to be printed is received, the renderer 333 creates print data from the data to be printed.

Upon detecting that the store application 311 is to perform printing, the store device application 304 displays a print configuration screen specific to a vendor. Note that, similar to the store application 311, the store device application 304 is available from "Windows store."

Upon detecting that the desktop application 321 is to perform printing, the printer driver 303 may create print data based on the details of the configuration that are made in the print configuration screen displayed by the extension configurator 313. In contrast, upon detecting that the store application 311 is to perform printing, the printer driver 303 may create print data based on the details of the configuration that are made in the print configuration screen displayed by the store device application 304.

The extension configurator 313 and the store device application 304 form a UI unit 305 for displaying a print configuration screen specific to a vendor.

<Storage Area that can be Accessed by the V4 Printer Driver 303 and the Store Device Application 304>

Figure 5:
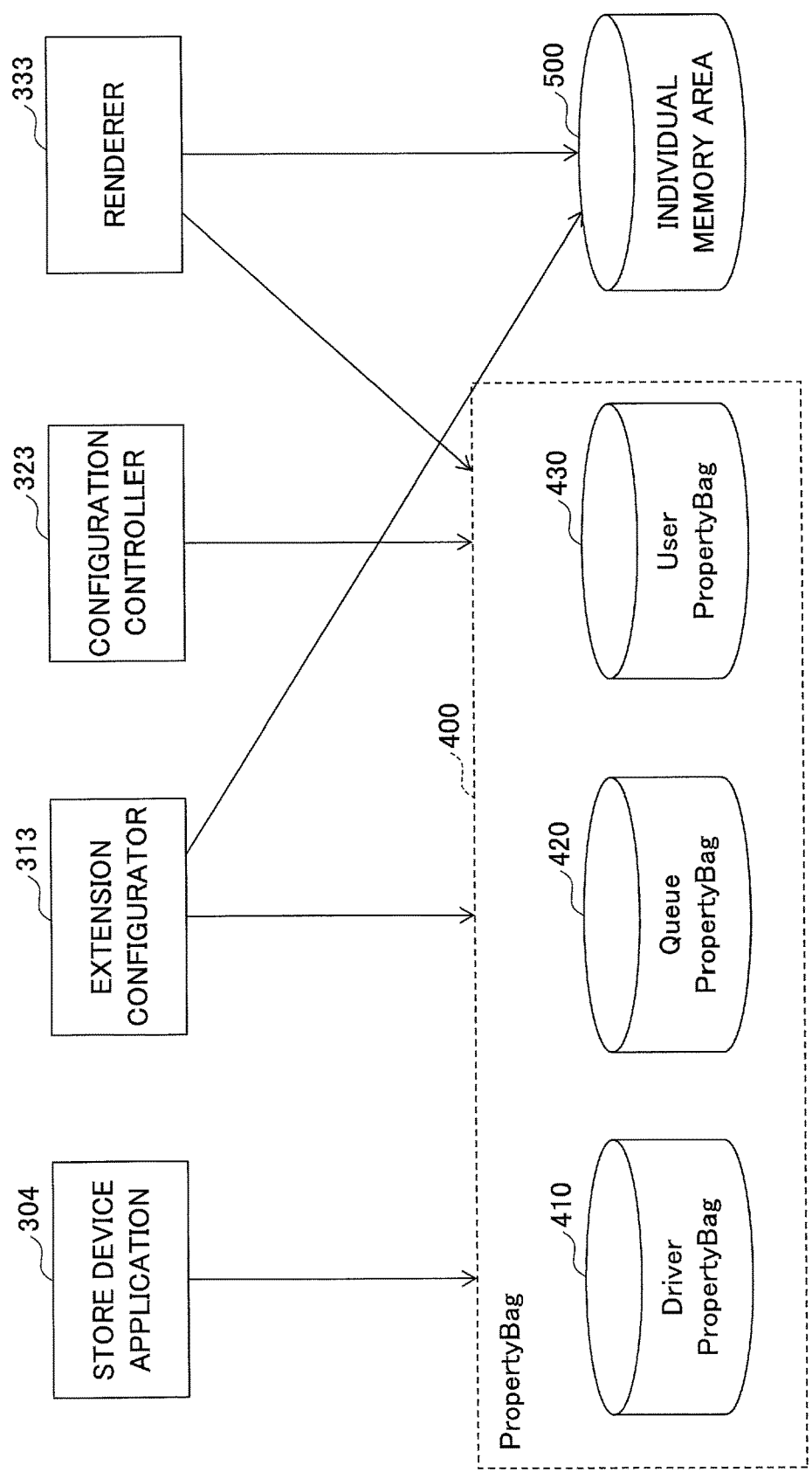
FIG. 5 is a diagram illustrating a storage area accessible by a V4 printer driver and a store device application.

Next, a storage area that can be accessed by the V4 printer driver 303 and the store device application 304 is described by referring to FIG. 5. FIG. 5 is a diagram illustrating the storage area that can be accessed by the V4 printer driver 303 and the store device application 304.

As illustrated in FIG. 5, the extension configurator 313, the configuration controller 323, the renderer 333, and the store device application 304 can access a storage area that is referred to as Property Bag 400. Note that, such access to the storage area can be executed using an Application Programming Interface (API) provided by the OS 302.

As illustrated in FIG. 5, the PropertyBag 400 includes DriverPropertyBag 410; QueuePropertyBag 420; and UserPropertyBag 430.

The DriverPropertyBag 410 is a storage area for storing configuration information that is determined upon creating the V4 printer driver 303. The extension configurator 313, the configuration controller 323, the renderer 333, and the store device application 304 are capable of reading out various types of information from the DriverPropertyBag 410. However, the extension configurator 313, the configuration controller 323, the renderer 33, and the store device application 304 are incapable of writing information in the DriverPropertyBag 410.

The QueuePropertyBag 420 is a storage area for storing configuration information for each logical printer (printer icon). The extension configurator 313 and the store device application 304 are capable of reading out various types of information from and writing various types of information in the QueuePropertyBag 420. Furthermore, the setting controller 323 and the renderer 333 are capable of reading out various types of information from the QueuePropertyBag 420.

Note that a logical printer is, for example, a virtual printer that is displayed as a printer icon in a printer folder of the OS 302. For example, a user of the client device 10 can create, for a single image forming apparatus 20, a plurality of logical printers with respective different configurations (e.g., a document size, an orientation, and print quality).

The UserPropertyBag 430 is a storage area that stores, for each logical printer, configuration information for each user. The extension configurator 313, the configuration controller 323, and the store device application 304 are capable of reading out various types of information from and writing various types of information in the UserPropertyBag 430.

Additionally, the extension configurator 313 and the renderer 333 are capable of reading out various types of information from and writing various types of information in an individual memory area 500.

The individual memory area 500 is implemented, for example, using a registry and a file. The individual memory area 500 is a storage area that is different from the PropertyBag 400. The individual memory area 500 is defined by a vendor that provides the V4 printer driver 303.

Due to the restriction applied by the OS 302, the store device application 304 is incapable of accessing a storage area other than the PropertyBag 400. Furthermore, the configuration controller 323 is incapable of accessing a storage area other than the DevmodePropertyBag and the PropertyBag 400, which are described above. Namely, the store device application 304 and the configuration controller 323 are incapable of reading out information from and writing information in the individual memory area 500.

This is the same as the restriction applied to the store application 311. For example, the restriction is for preventing the store device application 304 and the configuration controller 323 from adversely affecting the operation of the OS 302 by changing the registry, etc., used by the OS 302. Such a technique may be referred to as a sandbox.

<Functional Configuration>

Figure 6:
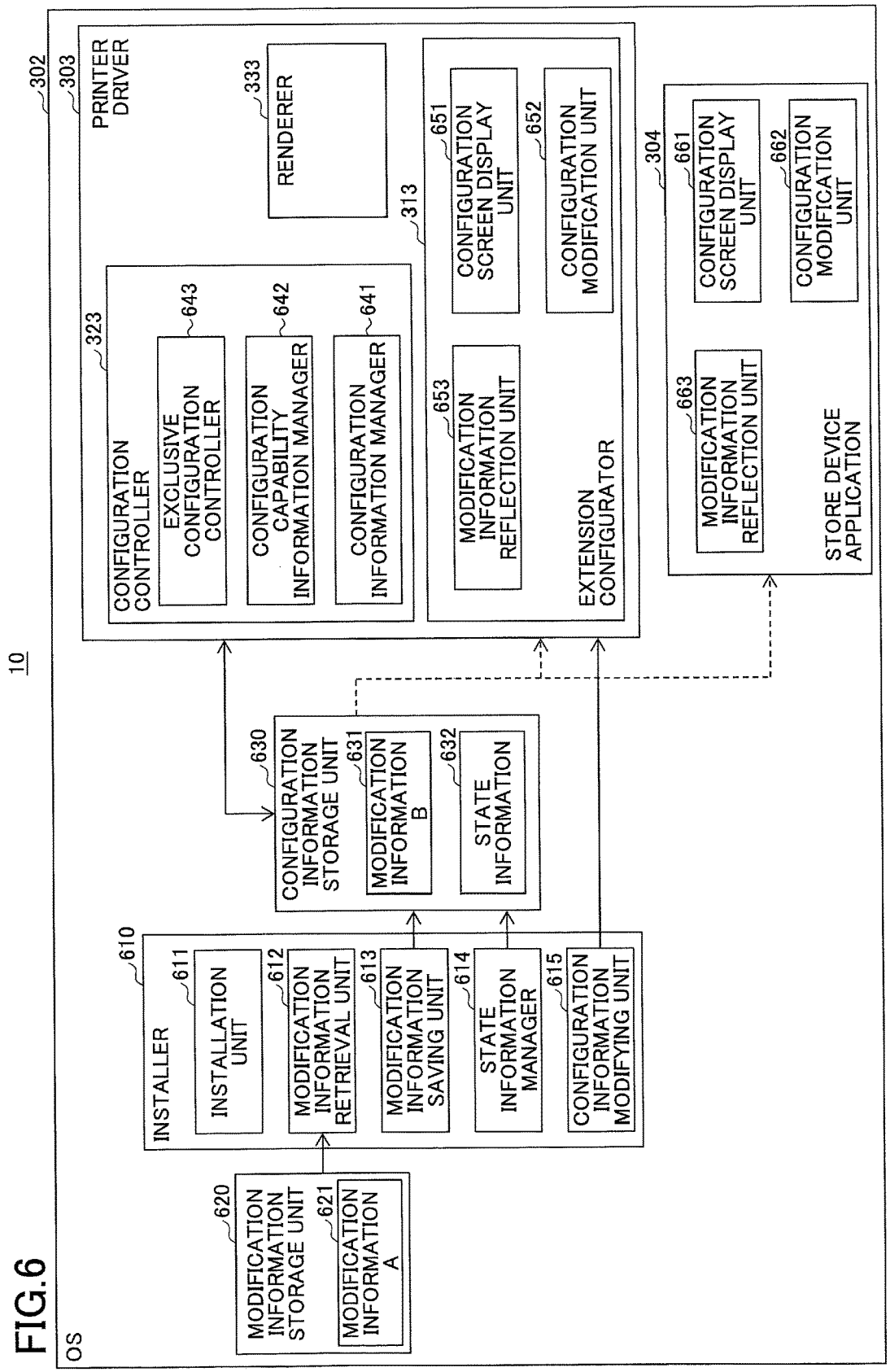
FIG. 6 is a diagram illustrating an example of a functional configuration of a client device according to the embodiment.

FIG. 6 is a diagram illustrating an example of a functional configuration of the client device 10 according to the embodiment.

The client device (information processing device) 10 is an information processing device that executes a program, such as the OS 302, an installer 610, the printer driver 303, and the store device application 304. Note that the OS 302, the printer driver 303, and the store device application 304 respectively correspond to the OS 302, the printer driver 303, and the store device application 304 illustrated in FIG. 4.

The installer 610 is an installation program for installing the printer driver 303, which is a V4 printer driver, in the client device 10, so that the printer driver 303 can be used in the client device 10.

A configuration information storage unit 630 is a storage area (e.g., the PropertyBag 400) that can be used by a script of the printer driver 303 for managing the configuration information using a script for controlling configuration information for printing (a line-breaking script).

A modification information storage unit 620 is a storage area that is different from the configuration information storage area 630. The modification information storage unit 620 stores modification information A 621, which is an information for modifying a default value of the configuration information for printing in accordance with a request of an administrator. Table 1 below illustrates examples of the default values of the configuration information for printing.

TABLE 1

| Configuration item | Options | Default value |
|---|---|---|
| Document size | A4/Letter | A4 |
| Color configuration | color/monochrome | color |
| Duplex printing | (N/A)/long side binding/short side binding | N/A |
| N in 1 printing | (N/A)/2-in-1/ 4-in-1/ 9 in 1 | N/A |
| Paper type | plain paper/special paper | plain paper |
| ... | ... | ... |

Table 1 illustrates examples of the default values of the configuration information for printing in the printer driver 303.

In the example of Table 1, the printer driver 303 is provided with configuration items, such as a document size, a color configuration, duplex printing, N-in-1 printing, and a paper type. For each configuration item, an option and a predetermined value, which is a default value, are stored. In the embodiment, it is assumed that the printer driver 303 holds, for example, default values of the configuration information, such as that of illustrated in Table 1.

In the embodiment, by storing the modification information A 621 in the modification information storage unit 620 and executing the installer 610, an administrator administrating the client device 10 is allowed to customize (modify) one or more default values of the configuration information illustrated in Table 1.

Note that customization of the one or more default values of the configuration information implies that the one or more default values of the configuration information at the time of the installation of the printer driver 303 in the client device 10 are modified by an administrator of the information processing system 1. For example, an operation of modifying configuration information for printing during using the client device 10 in which the printer driver 303 has already been installed is not included in the above-described customization.

Customization of one or more default values of the configuration information includes, for example, modification of a default value in which a default color configuration is modified from "color" to "monochrome," restriction of a print configuration such that the options for the color configuration are restricted only to "monochrome," and stabilization of a print configuration.

Further, in the V4 printer driver, when one or more default values of the configuration information are to be customized, the customization process is applied to each of the configuration controller 323 and the UI unit 305.

(Functional Configuration of the Installer)

The installer 610 includes an installation unit 611; a modification information retrieval unit 612; a modification information saving unit 613; a state information manager 614; and a configuration information modifying unit 615.

The client device 10 implements the installation unit 611, the modification information retrieval unit 612, the modification information saving unit 613, the state information manager 614, and the configuration information modifying unit 615, for example, by executing the installer 610 by the CPU 106 of FIG. 2.

The installation unit 611 executes, among a series of processes for installing the printer driver 303 in the client device 10, an installation process of a generic V4 printer driver. The process of installing the V4 printer driver executed by the installation unit 611 is described below.

The modification information retrieval unit 612 retrieves (reads out) the modification information A 621 stored in the modification information storage unit 620.

The modification information saving unit 613 saves the modification information A 621 retrieved by the modification information retrieval unit 612 in the configuration information storage unit 630. The modification information stored in the configuration information storage unit 630 may be the same as the modification information A 621 stored in the modification information storage unit 620. However, in order to distinguish the modification information stored in the configuration information storage unit 630 from the modification information A 621 stored in the modification information storage unit 620, the modification information stored in the configuration information storage unit 630 is denoted as the modification information B 631.

The state information manager 614 maintains state information 632 stored in the configuration information storage unit 630. Table 2 illustrates an example of the state information 632.

TABLE 2

|  | Configured value | Details of configuration |
|---|---|---|
| State information | 0 or 1 | 0: Invalid 1: Valid |

As described in Table 2, the state information 632 indicates whether a current state is an "invalid" state (a first state) or a "valid" state (a second state, a predetermined state). The state information 632 is usually set to be the "invalid" state (configured value 0). When it is detected that the modification information B 631 stored in the configuration information storage unit 630 is reflected in the configuration information, (e.g., during running the installer 610), the state information 632 is set to be "valid" (configuration value 1).

As an example, after the modification information saving unit 613 saves the modification information in the configuration information storage unit 630, the state information manager 614 modifies the state information 632 stored in the configuration information storage unit 630 from the "invalid" state to the "valid" state.

As another example, upon detecting that the installation unit 611 starts the above-described installation process (e.g., prior to starting the installation process), the state information manager 614 modifies the state information 632 stored in the configuration information storage unit 630 from the "invalid" state to the "valid" state.

Further, after the configuration information in which the modification information B 631 is reflected is configured as the one or more default values of the configuration information, the state information manager 614 sets the state information 632 stored in the configuration information storage unit 630 to be the "invalid" state.

The configuration information modifying unit 615 sets the configuration information in which the modification information B 631 is reflected in a default value of the configuration information. For example, the configuration information modifying unit 615 sets (saves) the configuration information created by the configuration controller 323 so as to reflect the modification information B 631 in the one or more default values of the configuration information using an application program interface (API) prepared by the OS 302.

(Functional Configuration of the Printer Driver)

The printer driver 303 (a V4 printer driver or a printer driver with a similar architecture) manages the configuration information using a script for controlling configuration information for printing (e.g., a line-braking script). As described above by referring to FIG. 4, the printer driver 303 includes the extension configurator 313; the configuration controller 323, and the renderer 333.

The client device 10 implements the extension configurator 313, the configuration controller 323, and the renderer 333, for example, by executing the printer driver 303 by the CPU 106 of FIG. 2.

The configuration controller 323 provides configuration information for printing by using a script for controlling the configuration information for printing (e.g., a line-braking script). The configuration controller 323 includes a configuration information manager 641; a configuration capability information manager 642; and an exclusive configuration controller 643.

The configuration information manager 641 converts, using a script, configuration information (first configuration information) in a Devmode format (first format) into configuration information (second configuration information) in a PrintTicket format (second format), and converts, using the script, the second configuration information in the second format into the first configuration information in the first format.

The configuration information for printing according to the embodiment includes the first configuration information in the Devmode format and the second configuration information in the PrintTicket format.

The first configuration information in the Devmode format is configuration information in a binary format, which is referred to as a DEVMODE structure. The one or more default values of the configuration information are stored in the DEVMODE structure.

The second configuration information in the PrintTicket format is configuration information that represents a print configuration, which is based on a specification referred to as PrintSchema, in an Extensible Markup Language (XML) format.

Basically, a V4 printer driver executes a process using configuration information in the PrintTicket format. However, depending on the application 301, the V4 printer driver may execute a process based on a print configuration in the Devmode format, or execute a process based on a print configuration in the PrintTicket format. Accordingly, the V4 printer driver is basically provided with a function for creating configuration information in the PrintTicket format from configuration information in the Devmode format, and a function for creating configuration information in the Devmode format from configuration information in the PrintTicket format. Note that, in the following description, the expression "creating configuration information" may include a process of creating configuration information in the PrintTicket format from configuration information in the Devmode format and a process of creating configuration information in the Devmode format from configuration information in the PrintTicket format.

Furthermore, upon detecting that the state information 632 indicates the "valid" state, the configuration information manager 641 of the printer driver 303 according to the embodiment creates configuration information using (to reflect) the modification information B 631. Additionally, upon detecting that the state information 632 indicates the "invalid" state, the configuration information manager 641 creates configuration information without using (not to reflect) the modification information B 631.

Accordingly, for example, during installation of the printer driver 303, the configuration information manager 641 can modify configuration information so as to reflect details of the modification of the modification information B 631. During normal use, the configuration information manager 641 does not affect the configuration information modified by a user.

The configuration capability information manager 642 maintains configuration capability information indicating configuration values configurable by the printer driver 303. The configuration values configurable by the printer driver 303 include, for example, a document size (e.g., A4, Letter, and B5), duplex printing (e.g., N/A, long side binding, and short side binding), N-in-1 printing (e.g., N/A, 2-in-1, and 4-in-1).

Upon receiving a request for retrieving configuration capability information of the printer driver 303, for example, from the application 301 or the OS 302, the configuration capability information manager 642 provides the configuration capability information to the request source of the retrieval request.

The configuration capability information manager 642 preferably reflects, in the configuration capability information, the details of the modification of the modification information B 631 stored in the configuration information storage unit 630.

In response to detecting that configuration information in the PrintTicket format includes mutually exclusive configuration values that are disallowed to be simultaneously configured, the exclusive configuration controller 643 modifies the configuration values so as to eliminate the exclusive relationship.

For example, when the document size "135" and the paper feed tray "tray 2" are configured in the configuration information in the PrintTicket format, and when the document size of the tray 2 is "A4," the exclusive configuration controller 643 automatically changes the setting on the paper feed tray to "automatic selection," for example.

The extension configurator 313 displays a configuration screen of the printer driver 303, which is displayed when printing is performed from the desktop application 321 of FIG. 4. The extension configurator 313 includes a configuration screen display unit 651; a configuration modification unit 652; and a modification information reflection unit 653.

The configuration screen display unit 651 causes the display device 102 to display the configuration screen of the print configuration of the printer driver 303.

Upon detecting that a print configuration is modified by a user, the configuration modification unit 652 reflects, in the configuration information, the modified configuration using the configuration screen of the print configuration, which is caused to be displayed by the configuration screen display unit 651.

The modification information reflection unit 653 retrieves the modification information B 631 stored in the configuration information storage unit 630 to reflect the modification information B 631 in the configuration screen displayed by the configuration screen display unit 651.

The store device application 304 displays a configuration screen of the printer driver 303, which is displayed when printing is performed from the store application 311 of FIG. 4. The store device application 304 includes a configuration screen display unit 661; a configuration modification unit 662; and a modification information reflection unit 663. Note that the functions of the configuration screen display unit 661, the configuration modification unit 662, and the modification information reflection unit 663 of the store device application 304 are the same as the functions of the configuration screen display unit 651, the configuration modification unit 652, and the modification information reflection unit 653 of the modification information reflection unit 663, respectively.

<Basic Processing Flow of the V4 Printer Driver>

Before describing the process of the printer driver 303 according to the embodiment, an outline of a basic process of a generic V4 printer driver is described.

(Installation Process)

FIG. 7 is a sequence diagram illustrating an installation process of a V4 printer driver according to the embodiment. This process illustrates an example of a process by a configuration controller 730 during installation of a generic V4 printer driver. It is assumed that an installer 720 illustrated in FIG. 7 is an installer of the generic V4 printer driver, and the configuration controller 730 is a configuration controller of the generic V4 printer driver.

At step S701, for example, in response to an operation by a user, the installer 720 transmits, to the OS 302, an installation request for requesting installation of a V4 printer driver.

At step S702, the OS 302 requests the configuration controller 730 of the V4 printer driver to convert configuration information in the Devmode format into configuration information in the PrintTicket format.

At step S703, the configuration controller 730 creates the configuration information in the PrintTicket format from the configuration information in the Devmode format stored in the Devmode structure.

At step S704, the configuration controller 730 transmits, to the OS 302, a completion notification including the created configuration information in the PrintTicket format.

At step S705, the OS 302 requests the configuration controller 730 to execute an exclusive process for the transmitted configuration information in the PrintTicket format.

At step S706, the configuration controller 730 executes the exclusive process for the configuration information. For example, in the exclusive process, the configuration controller 730 extracts items that are disallowed to be simultaneously configured from the configuration information, and the configuration controller 730 modifies the configuration.

At step S707, the configuration controller 730 transmits, to the OS 302, a completion notification including the configuration information in the PrintTicket format to which the exclusive process is applied.

At step S708, the OS 302 requests the configuration controller 730 to convert the configuration information in the PrintTicket format into the configuration information in the Devmode format.

At step S709, the configuration controller 730 creates the configuration information in the Devmode format from the configuration information in the PrintTicket format.

At step S710, the configuration controller 730 stores the created configuration information in the Devmode format in the Devmode structure.

At step S711, the configuration controller 730 transmits a completion notification to the OS 302.

At step S712, the OS 302 transmits a completion notification of the installation to the installer 720.

By the above-described process, the exclusive process is applied to the configuration information of the V4 printer driver installed in the client device 10, and the processed configuration information is configured as the one or more default values of the configuration information.

(Configuration Process of the Configuration Information)

FIG. 8 is a sequence diagram of an example of a configuration process of the configuration information in the V4 printer driver according to the embodiment. This process illustrates an example of the configuration process of the configuration information in a generic V4 printer driver.

At step S801, a user performs a print configuration operation on the application 301.

At step S802, upon receiving the operation of the configuration request by the user, the application 301 transmits a request for displaying a print configuration to the OS 302 at step S803.

At step S804, the OS 302 requests the configuration controller 730 of the V4 printer driver to convert the configuration information in the Devmode format into configuration information in the PrintTicket format.

At step S805, the configuration controller 730 reads out the configuration information in the Devmode format stored in the Devmode structure.

At step S806, the configuration controller 730 creates the configuration information in the PrintTicket format from the configuration information in the Devmode format. Note that the process at step S806 corresponds to the process at step S703 of FIG. 7.

At step S807, the configuration controller 730 transmits, to the OS 302, a completion notification including the created configuration in the PrintTicket format.

At step S808, the OS 302 requests the configuration controller 730 to create configuration capability information (PrintCapabilities).

At step S809, the configuration controller 730 creates the configuration capability information in the PrintCapabilities format.

At step S809, the configuration controller 730 transmits, to the OS 302, a completion notification including the created configuration capability information in the PrintCapabilities format.

At step S811, the OS 302 indicates the UI unit 305 to display the configuration screen. The indication to display the configuration screen includes the configuration information in the PrintTicket format and the configuration capability information in the PrintCapabilities format.

Note that, if the application 301 is the store application 311, the UI unit 305 is the store device application 304; and, if the application 301 is the desktop application 321, the UI unit 305 is the extension configurator 313.

At step S812, the UI unit 305 causes the display device 102 to display the configuration screen of the configuration information using the configuration information in the PrintTicket format, which is the current configuration value, and the configuration capability information in the PrintCapabilities format, which indicates configuration values that can be configured.

At step S813, the user performs an operation to modify the configuration information (update operation).

At step S814, the UI unit 305 modifies the configuration information in the PrintTicket format in accordance with the configuration operation performed by the user.

At step S815, the UI unit 305 transmits, to the OS 302, a completion notification including the modified configuration information in the PrintTicket format.

At step S816, the OS 302 the OS 302 requests the configuration controller 730 to convert the modified configuration information in the PrintTicket format into the configuration information in the Devmode format.

At step S817, the configuration controller 730 creates the configuration information in the Devmode format from the modified configuration information in the PrintTicket format.

At step S818, the configuration controller 730 stores the created configuration information in the Devmode format. Note that the process of steps S817 and S818 corresponds to the process of steps S709 and S710 of FIG. 7.

At steps S819 and S820, the configuration controller 730 transmits a completion notification to the OS 302 and the application 301.

(Printing Process)

FIG. 9 is a sequence diagram illustrating an outline of a printing process in the V4 printer driver according to the embodiment. This process illustrates an example of an outline of a printing process in a generic V4 printer driver. In the actual printing, various processes other than this process are executed. Note that a renderer 920 represents a renderer of the generic V4 printer driver.

At step S901, upon receiving a print operation by a user, the application 301 transmits a print request to the OS 302 at step S902.

At step 903, the OS 302 requests the configuration controller 730 to convert the configuration information in the Devmode format into print information in the PrintTicket format.

At step S904, the configuration controller 730 reads out the configuration information in the Devmode format.

At step S905, the configuration controller 730 creates configuration information in the PrintTicket format from the configuration information in the Devmode format.

At step S806, the configuration controller 730 reports, to the OS 302, a completion notification including the created configuration information in the PrintTicket format.

At step S907, the OS 302 transmits, to the renderer 920, a rendering command to request for creation of print data from the data to be printed. This notification includes, for example, the configuration information in the PrintTicket format.

At step S908, the renderer 920 creates the print data. At step S909, the renderer 920 transmits the created print data to the OS 302.

At step S910, the OS 302 transmits the print data received from the renderer 920 to the image forming apparatus 20.

At step S911, the image forming apparatus 20 executes printing of the print data. Upon detecting that printing is completed, the image forming apparatus 20 transmits a completion notification to the OS 302 at step S912.

As illustrated in FIG. 7 through FIG. 9, the configuration information of the V4 printer driver is stored in the Devmode format, and the process of the V4 printer driver is executed in the PrintTicket format. Thus, in the V4 printer driver, the process of creating configuration information, such as that of illustrated in steps S703 and S709 of FIG. 7, is frequently executed.

<Details of the Process>

Next, a flow of the information processing method by the client device 10, the installer 610, and the printer driver 303 according to the embodiment is described.

First Example

FIG. 10A is a flowchart illustrating an example of an installation process of a printer driver according to a first example. It is assumed that the state information 632 in the configuration information storage unit 630 is set to be the "invalid" state, which is the default state, at the start of the process illustrated in FIG. 10A.

Note that the state information 632 indicates whether the current state is the "invalid" state (first state) for disallowing creation of the configuration information using the modification information B 631 or the "valid" state (second state, predetermined state) allowing creation of the configuration information using the modification information B 631.

As described above, the state information 632 is usually set to be the "invalid" state (configuration value 0). When the modification information B 631 stored in the configuration information storage unit 630 is to be reflected in the configuration information (e.g., during execution of the installer 610), the state information 632 is set to be the "valid" state (configuration value 1).

By referring to the state information 632 to determine whether the state information 632 is "valid" or "invalid," the configuration controller 730 can determine whether it is allowed to reflect the modification information B 631 in the configuration information. As a result, when the state information 632 is the "invalid" state, the configuration controller 730 does not reflect the modification information B 631 in the configuration information. Thus, for example, it can be controlled so that the modification information B 631 is not to be reflected in the configuration information that is intentionally modified by a user. In the embodiment, this control is implemented by setting, by the state information manager 614 of the installer 610, the state information 632 to be "invalid," after the modification information is reflected in the configuration information during installation.

At step S1001, an installation unit 611 of the installer 610 installs the printer driver 303 in the client device 10, and the installation unit 611 starts an installation process of the V4 printer driver, such as that illustrated in FIG. 7.

At step S1002, the configuration controller 323 of the printer driver 303 is invoked by the OS 302, and the configuration controller 323 determines whether the state information 632 of the configuration information storage unit 630 is the "valid" state or the "invalid" state.

Upon detecting that the state information is "valid," the configuration controller 323 advances the process to step S1008. Upon detecting that the state information 632 is the "invalid" state, the configuration controller 323 advances the process to step S1003.

Here, as described above, the state information 632 is set to be the "invalid" state, the configuration controller 323 advances the process to step S1003.

At step S1003, the configuration controller 323 of the printer driver 303 creates configuration information without using (not to reflect) the modification information. For example, the configuration controller 323 executes the process of steps S703 through S710 of FIG. 7. By step S1003, the installation process of the generic V4 printer driver illustrated in FIG. 7 is completed.

At step S1004, the modification information retrieval unit 612 of the installer 610 retrieves the modification information A 621 from the modification information storage unit 620. Note that, upon determining that the modification information A 621 is not stored in the modification information storage unit 620, the modification information retrieval unit 612 terminates the process, for example.

At step S1005, the modification information saving unit 613 of the installer 610 saves the modification information A 621 retrieved by the modification information retrieval unit 612 in the configuration information storage unit 630. At this time, the modification information stored in the configuration information storage unit 630 is referred to as the modification information B 631. The modification information B 631 is used for creating the configuration information at step S1008.

Note that the storage location of the modification information B 631 stored in the configuration information storage unit 630 can be identified by a logical printer name (printer icon name) at the time of installing the printer driver 303 at step S1001.

At step S1006, the state information manager 614 of the installer 610 updates the state information 632 in the configuration information storage unit 630 from the "invalid" state to the "valid" state. Note that the state information manager 614 may update the state information 632 in the configuration information storage unit 630 from the "invalid" state to the "valid" state, prior to executing the process at steps S1003 and S1004. Namely, it suffices if the state information manager 614 sets the state information 632 included in the configuration information storage unit 630 to the "valid" state (the predetermined state) when the modification information saving unit 613 saves the modification information A 621 in the configuration information storage unit 630.

At step S1007, the configuration information modifying unit 615 of the installer 610 requests the printer driver 303 to retrieve the configuration information. As a result, the OS 302 invokes the configuration controller 323.

At step S1002, the configuration controller 323 of the printer driver 303 determines whether the state information 632 in the configuration information storage unit 630 is the "valid" state or the "invalid" state.

Here, the state information 632 is set to "valid" at step S1006, the configuration controller 323 advances the process to step S1008.

At step S1008, the configuration controller 323 of the printer driver 303 creates the configuration information using (to reflect) the modification information B 631 stored in the configuration information storage unit 630.

FIG. 11 is a diagram illustrating an example of the configuration information according to the first example prior to modification. The configuration information 1100 prior to modification illustrated in FIG. 11 includes configuration information of a color configuration 1101; a document size 1102; duplex printing 1103; a paper type 1104; and N-in-1 printing 1105.

In the configuration information 1100 prior to modification, as illustrated in Table 1, the color configuration 1101 is set to "Color ("psk:Color")," the paper size 1102 is set to "A4 ("psk: ISOA4")," and the duplex printing 1130 is set to "N/A ("psk:none")." Furthermore, in the configuration information 1100 prior to modification, the paper type 1104 is set to "plain paper ("psk:Plain")," and the N-in-1 printing 1105 is set to "N/A ("xsd:integer">1)."

FIG. 12 is a diagram illustrating an example of the configuration information according to the first example. In the configuration information 1200 illustrated in FIG. 12, "item name" indicates each function (name of the function). For example, "item name="mediatype" indicates document setting, "item name="duplex" indicates duplex printing, "item name="colorbw" indicates a color/monochrome configuration, and "item name="layout" indicates a layout.

Further, "default" indicates that a predetermined value (default value) is modified to be a specified value. For example, (item name="mediatype" default="special") indicates that the default value of the document setting is set to be special paper.

Furthermore, "hidden" indicates that a corresponding configuration item is not to be displayed on the UI screen of the printer driver 303. For example, (item name="duplex" hidden="yes") indicates that the configuration item of the duplex printing is not displayed on the UI screen.

Further, "fixvalue" indicates that a configured value is fixed to a specified value and that modification of the configured value is disallowed. For example, "item name="colorbw" fixvalue="blackandwhite" indicates that a configured value of the color/monochrome configuration is fixed to monochrome.

Furthermore, "pickone" indicates that options of a configuration item are limited only to the option specified by "pickone name." For example, (item name="layout" pickone name="2pagepersheet" pickone name="4pagepersheet") indicates that the options of the configured value of the N-in-1 printing are limited to 2-in-1 and 4-in-1. In the example of FIG. 12, modification information 1200 includes modification information 1201, which indicates that "the default value of the paper type (mediatype) is set to be special paper (special), and modification information 1202, which indicates that "the UI display of the duplex printing is set to be not displayed (hidden"yes")." Further, the modification information 1200 includes modification information 1203, which indicates that "color/monochrome configuration (colorbw) is fixed to monochrome (fixvalue="blackandwhite"), and modification information 1204, which indicates that "the options of the N-in-1 printing (layout) are limited to 2-in-1/4-in-1 ("2pagepersheet"/"4pagepersheet")."

Note that "hidden" indicates that the function is not displayed on the UI screen of the printer driver 303, and "hidden" is not for disallowing the function to be used. Accordingly, in the example of the configuration information 1200 indicated in FIG. 12, the configured value of the duplex printing configuration item may not be modified in the UI screen of the printer driver 303. However, it is possible to modify the configured value of the duplex printing configuration item using the configuration information from the application 301 to execute printing.

In contrast, "fixvalue" indicates that the configured value is to be fixed, and modification of the configuration from the application 301 is also disallowed.

FIG. 13 is a diagram illustrating an example of the configuration information according to the example 1 in which the modification information is reflected. The configuration information 1300 illustrated in FIG. 13 in which the modification information is reflected is obtained by modifying, by the modification information 1200 illustrated in FIG. 12, the configuration of the color configuration 1301, the paper type 1302, and the N-in-1 printing 1303 in the configuration information 1100 prior to modification illustrated in FIG. 11.

For example, in the configuration information 1300 in which the modification information illustrated in FIG. 13 is reflected, the color configuration 1301 is modified from "color ("psk:Color")" to "monochrome ("psk:Monochrome")". Further, the paper type 1302 is modified from "plain paper ("psk: Plain")" to "special paper ("ns0000.Special")." Furthermore, the N-in-1 printing 1303 is modified from "N/A ("xsd.integer">1)" to "2-in-1 ("xsd.integer">2).

Note that the modification information 1202, which indicates that "the UI display of the duplex printing is set to be N/A (hidden "yes"), of the modification information 1200 illustrated in FIG. 12 is the modification information on the UI, so that the modification information 1202 is not reflected in the configuration information 1300.

As described above, at step S1008 in FIG. 10A, the configuration controller 323 of the printer driver 303 creates the configuration information 1300 after modification by applying (reflecting) the modification 1200 to the configuration information 1100 prior to the modification.

At step S1009, the configuration information modifying unit 615 of the installer 610 sets the configuration information created by the configuration controller 323 of the printer driver 303 by reflecting the modification information B 631 in the one or more default values of the configuration information of the printer driver 303. For example, the configuration information modifying unit 615 modifies the one or more default values of the configuration information of the printer driver 303 by transmitting the created configuration information in which the modification information B 631 is reflected to the API for modifying the default configuration of the printer driver 303, which is provided by the OS 302.

At step S1010, the state information manager 614 of the installer 610 sets the state information 632 in the configuration information storage unit 630 to be the "invalid" state.

(Sequence Diagram of the Installation Process)

FIG. 10B and FIG. 10C are sequence diagrams illustrating an example of the installation process of the printer driver according to the first example. This process corresponds to the installation process of the printer driver 303, which is illustrated in FIG. 10A.

At step S1021, the installation unit 611 of the installer 610 installs the printer driver 303 in the client device 10 (OS 302). This process corresponds to the process at step S1001 of FIG. 9.

At step S1022, the OS 302 requests the configuration controller 323 of the printer driver 303 to convert the configuration information in the Devmode format into the configuration information in the PrintTicket format. For example, the OS 302 requests the conversion from the configuration information in the Devmode format into the configuration information in the PrintTicket format using the API (convertDevModeToPrintTicket), which is prepared in advance.

At step S1023, the configuration controller 323 retrieves the state information 632 from the configuration information storage unit 630. At this time, suppose that the state information 632 is set to be the "invalid" state.

At step S1024, the configuration controller 323 retrieves the modification information B 631 from the configuration information storage unit 630. At this time, it is assumed that the modification information B 631 is not stored in the configuration information storage unit 630.

At step S1025, the configuration controller 323 reads out the configuration information in the Devmode format from the DevmodePropertyBag.

Note that the DevmodePropertyBag is a storage area maintained by the OS 302. For example, the configuration controller 323 can retrieve, from the DevmodePropertyBag, the configuration information in the Devmode format of the printer driver 303 stored in the DEVMODE structure. Furthermore, when the configuration controller modifies the configuration information in the Devmode format stored in the DevmodePropertyBag, the details of the modification is reflected in the DEVMODE structure by the OS 302.

At step S1026, the configuration controller creates the configuration information in the PrintTicket format from the retrieved configuration information in the Devmode format.

At step S1027, the configuration controller 323 transmits, to the OS 302, a completion notification including the created configuration information in the PrintTicket format.

At step S1028, the OS 302 requests the configuration controller 323 to execute an exclusive process of the transmitted configuration information in the PrintTicket format. For example, the OS 302 requests the configuration controller 730 to execute an exclusive process of the configuration information in the PrintTicket format using an API (ValidatePrintTicket), which is prepared in advance.

At step S1029, the configuration controller 323 executes an exclusive process of the configuration information. For example, the configuration controller 323 creates configuration information that can be used by modifying or deleting, in the configuration information in the PrintTicket format, a configuration item or a configured value that are not allowed to be used.

At step S1030, the configuration controller 323 transmits, to the OS 302, a completion notification including the configuration information in the PrintTicket format, for which the exclusive process has been executed. Note that, in the following description, the process from step S1028 to S1030 may be referred to as "the exclusive process 1061 of the configuration information."

At step S1031, the OS 302 requests the configuration controller 323 to convert the configuration information in the PrintTicket format into the configuration information in the Devmode format. For example, the OS 302 requests the configuration controller 323 to convert the configuration information in the PrintTicket format into the configuration information in the DEVMODE format using an API (e.g., convertPrintTicketToDevmode), which is prepared in advance.

At step S1032, the configuration controller 323 extracts the configuration information from the PrintTicket, and, at step S1033, the configuration controller 323 stores the extracted configuration information in the DevmodePropertyBag.

At step S1034, the configuration controller 323 transmits a completion notification to the OS 302. Note that, in the following description, the process of steps S1031 through S1034 may be referred to as "the conversion process to Devmode format 1062."

At step S1035, the OS 302 reflects the details of the modification of the DevmodePropertyBag in the DEVMODE structure. At step S1036, the OS 302 transmits a completion notification to the installer 610. Note that the above-described process of steps S1022 through S1036 corresponds to the process at step S1003 of FIG. 10A.

Subsequently, at step S1037 of FIG. 10C, the modification information retrieval unit 612 of the installer 610 reads out the modification information A 621 from the modification information storage unit 620. Note that this process corresponds to the process at step S1004 of FIG. 10A.

At step S1038, the modification information saving unit 613 of the installer 610 saves the modification information A 621 read out by the modification information retrieval unit 612 in the configuration information storage unit 630. In the following, the modification information stored in the configuration information storage unit 630 is referred to as the modification information B 631, so that the modification information stored in the configuration information storage unit 630 is distinguished from the modification information A 621 stored in the modification information storage unit 620. Note that this process corresponds to the process at step S1005 of FIG. 10A.

At step S1039, the state information manager 614 of the installer 610 sets the state information 632 in the configuration information storage unit 630 to be "valid" (predetermined state). Note that this process corresponds to the process at step S1006 in FIG. 10A.

At step S1040, the configuration information modifying unit 615 of the installer 610 requests the OS 302 to retrieve the configuration information in the Devmode format. Note that this process corresponds to the process at step S1007 of FIG. 10A.

At step S1041, in response to the request for retrieving the configuration information in the Devmode format, the OS 302 requests the configuration controller 323 of the printer driver 303 to convert the configuration information in the Devmode format into the configuration information in the PrintTicket format. For example, the OS 302 requests for conversion from the configuration information in the Devmode format into the configuration information in the PrintTicket format using an API (convertDevModeToPrintTicket), which is prepared in advance.

At step S1042, the configuration controller 323 retrieves the state information 632 from the configuration information storage unit 630. Note that the state information 632 is set to "valid" at step S1039.

At step S1043, the configuration controller 323 retrieves the modification information B631 from the configuration information storage unit 630. Note that the modification information B 631 is stored in the configuration information storage unit 630 at step S1038.

At step S1044, the configuration controller 323 reads out the configuration information from the DevmodePropertyBag.

At step S1045, the configuration controller 323 creates the configuration information in the PrintTicket format by reflecting the modification information retrieved at step S1043 in the configuration information reads out at step S1044. Note that this process corresponds to the process at step S1008 of FIG. 10A.

At step S1046, the configuration controller 323 transmits, to the OS 302, a completion notification including the created configuration information in the PrintTicket format.

At step S1047, the OS 302 and the configuration controller 323 execute the exclusive process 1061 of the configuration information, such as that of illustrated in steps S1028 through S1030 of FIG. 10B.

At step S1048, the OS 302 and the configuration controller 323 execute the conversion process 1062 to Devmode format, such as that of illustrated in steps S1031 through S1034 of FIG. 10B.

At step S1049, the OS 302 transmits, to the installer, 610, a completion notification including the configuration information in the Devmode format.

At step S1050, the configuration information modifying unit 615 of the installer 610 sets the configuration information in the Devmode format included in the completion notification as a default value of the configuration information of the printer driver 303. For example, the configuration information modifying unit 615 requests the OS 302 to set the one or more default values of the configuration information using a predetermined API provided by the OS 302. Note that this process corresponds to the process at step S1009 of FIG. 10A.

At step S1051, the OS 302 transmits, to the installer 610, a completion notification indicating that setting of the one or more default values of the configuration information is completed.

At step S1052, the state information manager 614 of the installer 610 sets the state information 632 in the configuration information storage unit 630 to be the "invalid" state. Note that this process corresponds to the process at step S1010 of FIG. 10A.

By the above described process, during installation of the V4 printer driver 303, the modification information A 621 stored in the modification information storage unit 620 can be easily reflected in the one or more default values of the configuration information of the printer driver 303.

Note that, in the process illustrated in FIG. 10A, for example, immediately after completing the installation process at steps S1001 through S1003 of the V4 printer driver illustrated in FIG. 7, the process of reflecting the modification information is executed at and after step S1004. However, this timing is an example, and the process of reflecting the modification information at and after step S1004 can be executed at any timing after completing the installation of the V4 printer driver.

Second Example

Figure 14:
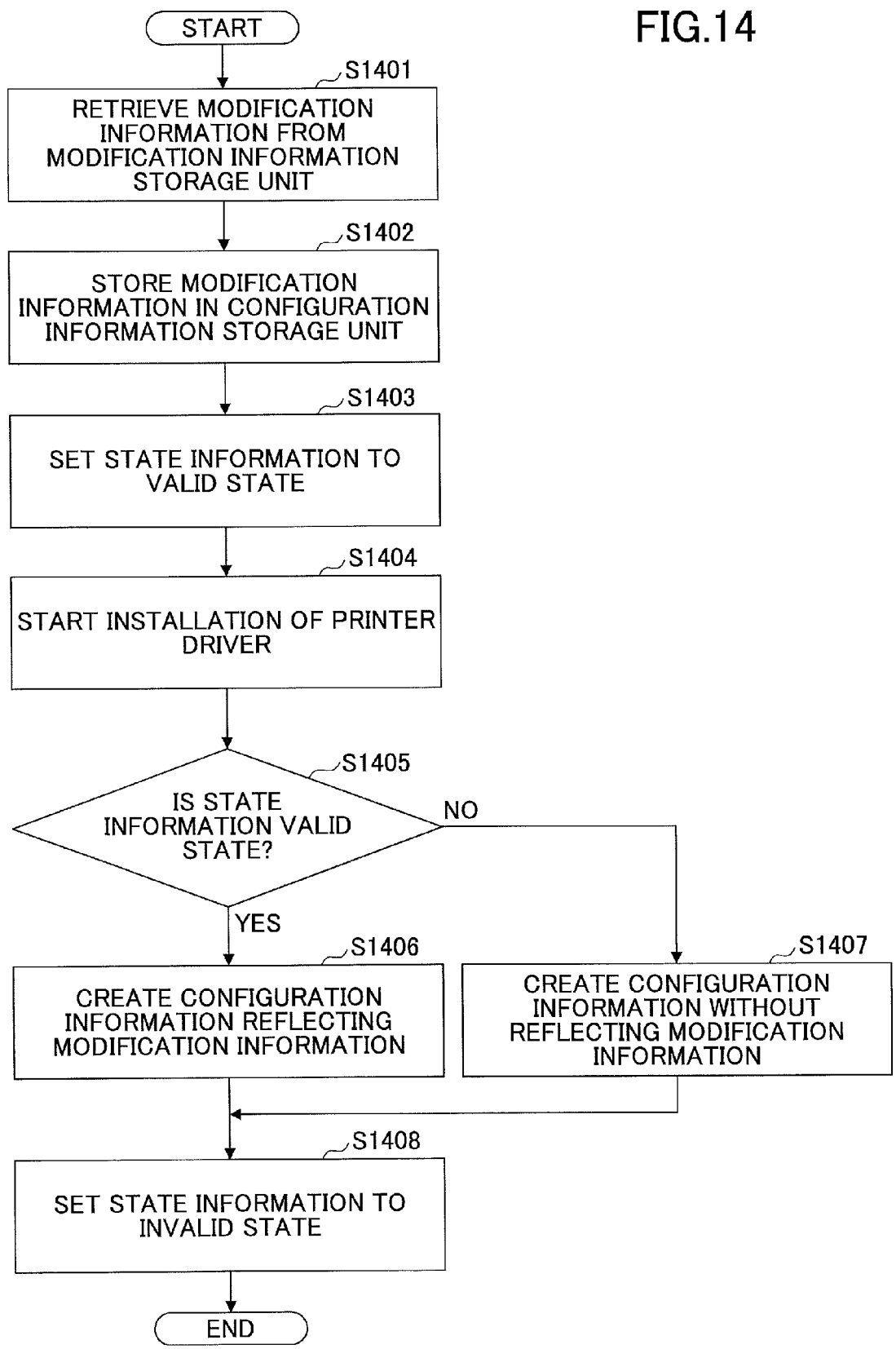
FIG. 14 is a flowchart illustrating an example of the installation process of the printer driver according to a second example.

FIG. 14 is a flowchart illustrating an example of an installation process of the printer driver according to a second example. In the first example, after completing the installation of the V4 printer driver, such as that of illustrated in FIG. 7 the modification information B 631 stored in the configuration information storage unit 630 is reflected in the one or more default values of the configuration information.

In the second example, an example of a case is described in which the modification information B 631 stored in the configuration information storage unit 630 is reflected in the one or more default values of the configuration information in the installation process of the V4 printer driver.

FIG. 14 is a flowchart illustrating an example of the installation process of the printer driver according to the second example. Note that, in this example, it is assumed that the state information 632 in the configuration information storage unit 630 is set to the "invalid" state, which is the default state, at the time of starting the process illustrated in FIG. 14.

At step S1401, the modification information retrieval unit 612 of the installer 610 retrieves the modification information A 621 from the modification information storage unit 620.

At step S1402, the modification information saving unit 613 of the installer 610 saves the modification information A621 retrieved by the modification information retrieval unit 612 in the configuration information storage unit 630.

At this time, in order to save the modification information A 621 retrieved by the modification information retrieval unit 612 in the configuration information storage unit 630, the modification information saving unit 613 estimates a logical printer name (printer icon name) of the printer driver 303 to be installed.

For example, when the configuration information storage unit 630 is the QueuePropertyBag 420, the QueuePropertyBag 420 is specifically the following registry.

KEY LOCAL MACHINE¥SYSTEM¥ControlSet001¥Control¥Print¥Printers¥(logical printer name)¥QueueProperties Originally, this registry (QueuePropertyBag 420) is automatically created during the installation of the printer driver 303; however, even if the registry is created prior to the installation, the contents of the registry can be read out during the installation. Note that the part (logical printer name) of the registry is modified by the OS 302 during the installation, so that the modification information saving unit 613 is required to estimate the part (logical printer name).

For example, when the OS 302 is Windows, and when the printer driver 303 is installed with an existing logical printer name (e.g., AA Printer Driver), the logical printer name is modified as described below.

For Japanese OS: "AA Printer Driver (Copy 1)"
For English OS: "AA Printer Driver (Copy 1)"

At this time, as the rule of modifying the logical printer name differs depending on the OS 302, the modification information saving unit 613 of the installer 610 estimates (identifies) the part (logical printer name) in accordance with an environment in which the printer driver 303 is to be installed. Furthermore, the modification information saving unit 613 saves the modification information A 621 retrieved by the modification information retrieval unit 612 in a registry corresponding to the estimated logical printer name, for example.

Here, the modification information saved in the configuration information storage unit 630 is referred to as the modification information B 631 in the following description.

At step S1403, the state information manager 614 of the installer 610 modifies the state information 632 in the configuration information storage unit 630 to be the "valid" state.

At step S1404, the installation unit 611 of the installer 610 installs the printer driver 303 in the client device 10 and starts the installation process of the V4 printer driver, such as that of illustrated in FIG. 7.

Note that the state information manager 614 may execute the process at step S1403 after executing the process at step S1404. Namely, it suffices if the state information manager 614 sets the state information 632 stored in the configuration information storage unit 630 to the "valid" state (predetermined state) at the time of starting, by the installation unit 611, the installation of the printer driver 303.

At step S1405, the configuration controller 323 of the printer driver 303 is invoked by the OS 302 and determines whether the state information 632 in the configuration information storage unit 630 is the "valid" state or the "invalid" state.

Upon determining that the state information 632 is the "valid" state, the configuration controller 323 advances the process to step S1406. However, upon determining that the state information 632 is the "invalid" state, the configuration controller 323 advances the process to step S1407.

Here, as the state information 632 is set to the "valid" state at step S1403, the configuration controller 323 advances the process to step S1406.

Note that, as the configuration controller 323 is invoked by the OS 302, for example, at the process of modifying the configuration information illustrated in FIG. 8 or the printing process illustrated in FIG. 9, the determination process at step S1405 and the process of configuring the configuration information at step S1407 in which the modification information is not reflected are required. This is for preventing the configuration information that is intentionally modified by a user from being modified with the modification information.

At step S1406, the configuration controller 323 of the printer driver 303 creates the configuration information using (reflecting) the modification information B 631 stored in the configuration information storage unit 630. For example, the configuration controller 323 executes the process at steps S703 through S710 of the installation process of the V4 printer driver, which is illustrated in FIG. 7. Additionally, when the configuration information in the PrintTicket format is created from the configuration information in the Devmode format at step S703, the configuration controller 323 creates the configuration information using (reflecting) the modification information B 631. Note that the method of reflecting the modification information in the configuration information is the same as the method of reflecting the modification information in the configuration information of the first example, which is described by referring to FIG. 11 through FIG. 13.

By this process, the configuration information in the Devmode format that is created using the modification information B 631 is stored as the one or more default values of the configuration information of the printer driver 303.

At step S1408, the state information manager 614 of the installer 610 sets the state information 632 in the configuration information storage unit 630 to the "invalid" state.

By the above-described process, the modification information can be reflected in the one or more default values of the configuration information of the printer driver 303, for example, during the installation process of the V4 printer driver, such as that of illustrated in FIG. 7.

<Reflecting the Configuration Capability Information in the Modification Information>

In the first and second examples, the cases are described where the modification information is reflected in the configuration information of the printer driver 303.

Furthermore, the configuration controller 323 of the printer driver 303 is provided with the configuration capability information manager 642 that reflects the modification information B 631 stored in the configuration information storage unit 630 in configuration capability information indicating one or more configuration values configurable in the printer driver 303. Here, the process of reflecting the modification information B 631 in the configuration capability information by the configuration capability information manager 642 is described by illustrating a specific example.

FIG. 15 is a diagram illustrating an example of the configuration capability information according to the embodiment prior to the modification. The configuration capability information 1500 is information that represents, as data in the XML format, a list of print configuration values that can be configured by the printer driver 303.

The configuration capability information 1500 illustrated in FIG. 15 is obtained by extracting the configuration item 1501 for the N-in-1 printing (psk:JobNUpAllDocumentsContiguously), among the configuration ability information of the printer driver 303.

As the default values of the configuration item 1501 for the N-in-1 printing, the printer driver 303 is provided with four options, which are "not to apply N-in-1 printing(1/1)" 1502, "2-in-1" 1503, "4-in-1" 1504, and "9-in-1", as illustrated in FIG. 15.

In contrast, the modification information 1200 illustrated in FIG. 12 includes the modification information 1204, which is "limit the options for N-in-1 printing (layout) to 2-in-1/4-in-1 ("2pagepersheet"/"4pagepersheet")."

In this case, the configuration capability information manager 642 creates the configuration capability information 1600 after the modification, such as that of illustrated in FIG. 16, by reflecting the modification information 1200 illustrated in FIG. 12 in the configuration capability information 1500 illustrated in FIG. 15.

Note that each of the configuration capability information 1500 illustrated in FIG. 15 and the configuration capability information 1600 illustrated in FIG. 16 is configuration capability information in the PrintCapabilities format.

FIG. 16 is a diagram illustrating an example of the configuration capability information according to the embodiment in which the modification information is reflected. In the configuration capability information 1600 after the modification illustrated in FIG. 16, the options for the configuration item 1501 for the N-in-1 printing is updated to be the two options, which are "2-in-1" 1503 and the "4-in-1" 1504.

As described above, the configuration capability information manager 642 included in the configuration controller 323 of the printer driver 303 reflects the modification information B 631 stored in the configuration information storage unit 630 in the configuration capability information of the printer driver 303. Consequently, the application 301 can recognize the configuration capability information of the printer driver 303 modified with the modification information B 631 by referring to the configuration capability information.

<Reflecting the Modification Information in the Configuration Screen>

The extended configurator 313 of the printer driver 303 is provided with the modification information reflection unit 653 that reflects the modification information B 631 stored in the modification information storage unit 630 in the configuration screen of the print configuration information to be displayed by the extended configurator 313.

Furthermore, the store device application 304 is provided with the modification information reflection unit 663 that reflects the modification information B 631 stored in the configuration information storage unit 630 in the configuration screen of the print configuration information displayed by the store device application 304.

The details of the process by the modification information reflection unit 663 of the store device application 304 are the same as the details of the process by the modification information reflection unit 653 of the extension configurator 313. Thus, the modification information reflection unit 653 of the extension configurator 313 is described here.

Figure 17A:
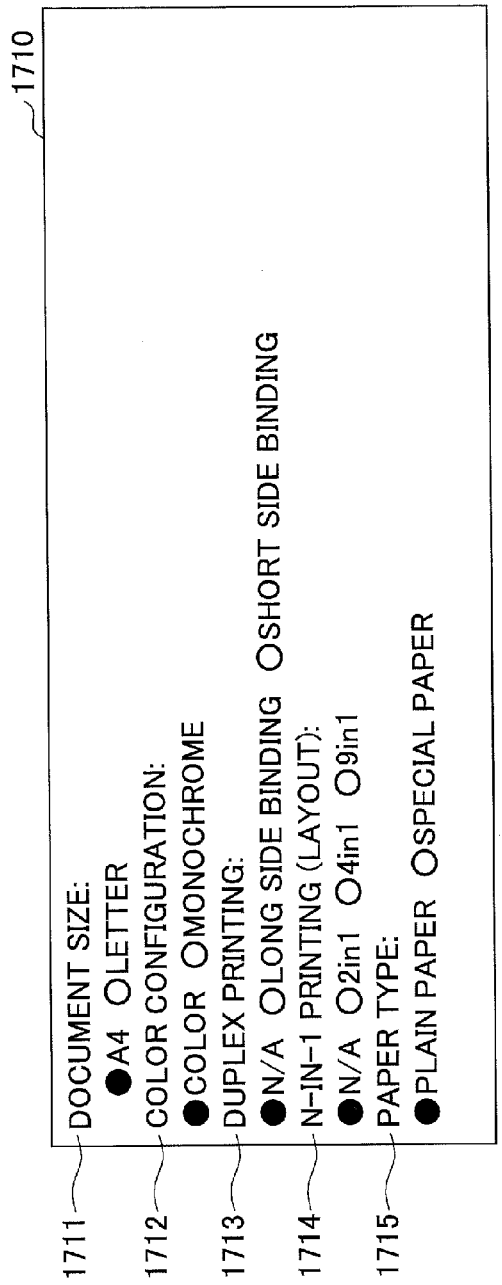
FIG. 17A is a diagram illustrating an example of a configuration screen according to the embodiment prior to modification.

FIG. 17A illustrates an example of the configuration screen 1710 to be displayed by the configuration screen display unit 651 included in the extension configurator 313 of the printer driver 303. The configuration screen 1710 prior to modification illustrated in FIG. 17A includes configuration items of the document size 1711; the color configuration 1712; the duplex printing 1713; the N-in-1 printing 1714; and the paper type 1715. Further, the default values of the corresponding configuration items are indicated by the black dots. For example, the default value of the document size 1711 is set to "A4," the default value of the color configuration is set to "color," the default value of the duplex printing 1713 is set to "N/A," the default value of the N-in-1 printing 1714 is set to "N/A," and the default value of the paper type 1715 is set to "plain paper."

FIG. 17A illustrates an example of the configuration screen 1710 to be displayed by the configuration screen display unit 651 included in the extension configurator 313 of the printer driver 303. The configuration screen 1710 prior to modification illustrated in FIG. 17A includes configuration items of the document size 1711; the color configuration 1712; the duplex printing 1713; the N-in-1 printing 1714; and the paper type 1715. Further, the default values of the corresponding configuration items are indicated by the black dots. For example, the default value of the document size 1711 is set to "A4," the default value of the color configuration is set to "color," the default value of the duplex printing 1713 is set to "N/A," the default value of the N-in-1 printing 1714 is set to "N/A," and the default value of the paper type 1715 is set to "plain paper."

In contrast, the modification information 1200 illustrated in FIG. 12 includes the modification information 1201, which indicates that "the default value of the paper type (mediatype) is set to be special paper (special)," and the modification information 1202, which indicates that "the UI display of the duplex printing (duplex x) is set to be not displayed (hidden "yes")."

Additionally, the modification information 1200 includes the modification information 1203, which indicates that "color/monochrome configuration (colorbw) is fixed to monochrome (fixvalue="blackandwhite")," and modification information 1204, which indicates that "the options of the N-in-1 printing (layout) are limited to 2-in-1/4-in-1 ("2pagepersheet"/"4pagepersheet")."

Figure 17B:
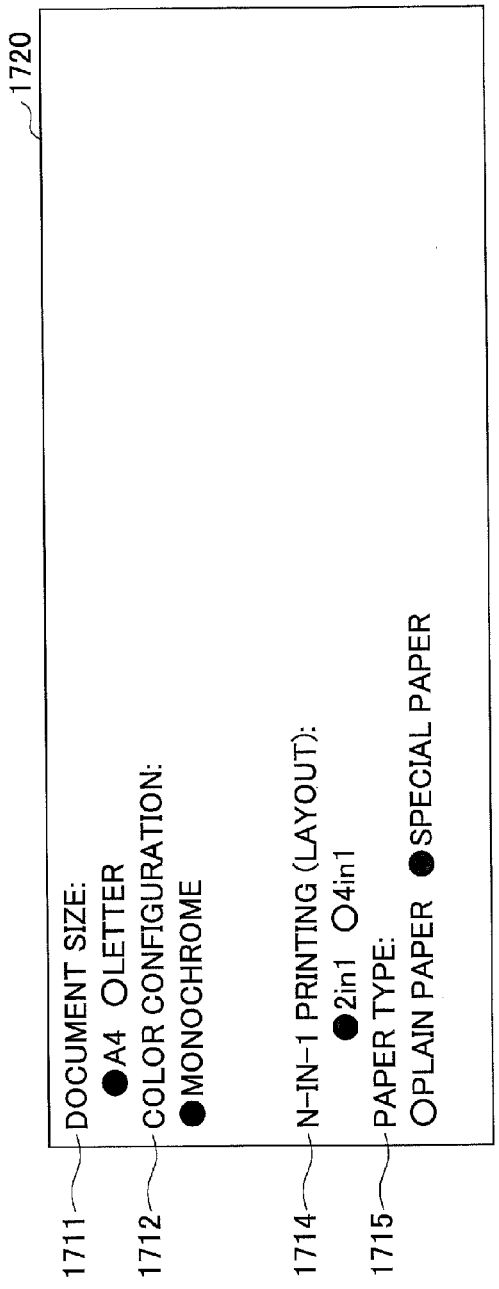
FIG. 17B is a diagram illustrating an example of the configuration screen according to the embodiment, which reflects the modification information.

In this case, the modification information reflection unit 653 reflects, for example, the modification information 1200 illustrated in FIG. 12 in the configuration information 1710 prior to the modification illustrated in FIG. 17A, and the modification information reflection unit 653 causes the configuration screen display unit 651 to display the configuration screen 1720 after the modification, such as that of is illustrated in FIG. 17B.

For example, in the configuration screen 1720 after the modification, which is illustrated in FIG. 17B, the default value of the paper type 1715 is modified to be the "special paper," as a result that the modification information 1201, which indicates that "the default value of the paper type (mediatype) is set to be special paper (special)," is reflected.

Furthermore, in the configuration screen 1720 after the modification, the default value of the color configuration 1712 is fixed to monochrome, as a result that the modification information 1203, which indicates that the "color/monochrome configuration (colorbw) is fixed to monochrome (fixvalue="blackandwhite")," is reflected.

Furthermore, in the configuration screen 1720 after the modification, the modification information 1202, which indicates that "the UI display of the duplex printing (duplex x) is set to be not displayed (hidden "yes")" is reflected, so that the configuration item of the duplex printing 1713 displayed on the configuration screen 1710 prior to the modification is not displayed.

Furthermore, the modification information 1204, which is "limit the options for N-in-1 printing (layout) to 2-in-1/4-in-1 ("2pagepersheet"/"4pagepersheet")" is reflected in the configuration screen 1720 after the modification, so that the options are only 2-in-1/4-in-1 in the configuration item of the N-in-1 printing 1714.

As described above, the modification information reflection unit 653 included in the extension configurator 313 of the printer driver 303 can reflect the modification information B 631 stored in the configuration information storage unit 630 in the configuration screen of the configuration information displayed by the extension configurator 313.

Similarly, the modification information reflection unit 663 included in the store device application 304 can reflect the modification information B 631 stored in the configuration information storage unit 630 in the configuration screen of the configuration information displayed by the store device application 304.

Note that, the functional configuration of the client device 10 illustrated in FIG. 6 is an example. For example, at least a part of each functional configuration included in the installer 610 may be included in the printer driver 303.

Furthermore, the client device 10 is an example of the information processing device in which the printer driver 303 is installed. The information processing device in which the printer driver 303 is installed may be the server apparatus 30 illustrated in FIG. 1, for example.

Third Example

In the first and second examples, the state information manager 614 of the installer 610 stores the state information 632 in the configuration information storage unit 630 to maintain the state information 632. In the third example, an example of a case is described in which the state information manager 614 of the installer 610 reflects the state information in the PrintTicket (configuration information).

<Functional Configuration>

Figure 18:
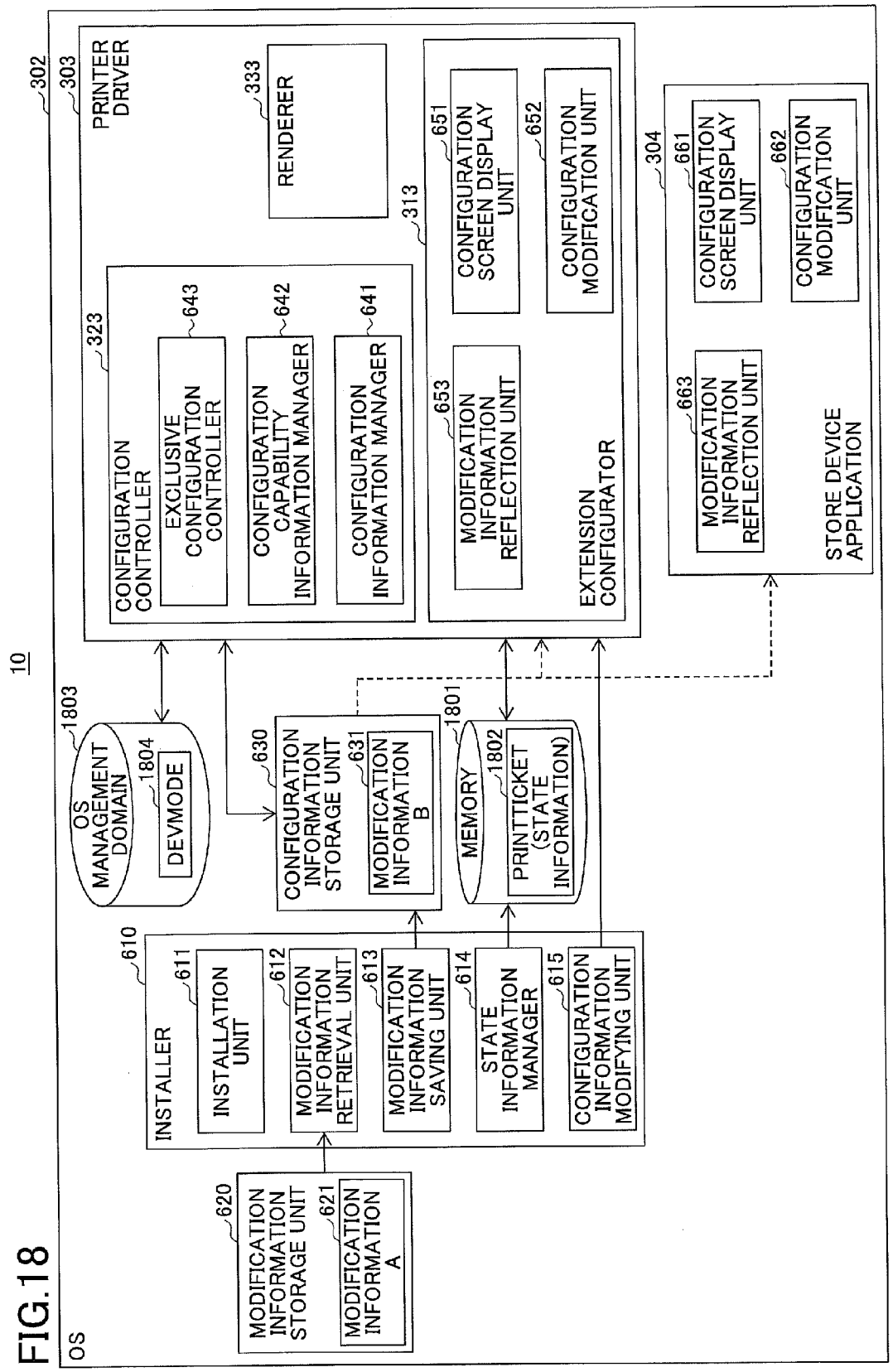
FIG. 18 is a diagram illustrating an example of a functional configuration of a client device according to a third example.

FIG. 18 is a diagram illustrating an example of a functional configuration of the client device according to the third example. The functional configuration of the client device 10 according to the third example is basically the same as the functional configuration of the client device 10 according to the embodiment illustrated in FIG. 6.

However, in the third example, the state information manager 614 of the installer 610 configures the state information which indicates the current state in PrintTicket 1802 on a memory 1801, instead of the configuration information storage unit 630.

The memory 1801 is a storage area implemented by the RAM 104 and the HDD 108 of the client device 10, for example.

An OS management domain 1803 is a storage area maintained by the OS 302 (e.g., a registry) among the storage areas implemented by the RAM 104 and the HDD 108 of the client device 10. The OS 302 stores the default values of the configuration information, for example, in the DEVMODE structure (which is referred to as DEVMODE, hereinafter) 1804 stored in the OS management domain 1803 so as to maintain the default values. The same applies to the first and second examples.

<The Processing Flow>

Next, the processing flow of the information processing method according to the third example is described.

FIGS. 19A and 19B are sequence diagrams illustrating the example of the installation process of the printer driver according to the third example. Note that, among the processes illustrated in FIGS. 19A and 19B, the detailed description of the process that is the same as the installation process of the printer driver according to the first example illustrated in FIGS. 10B and 10C is omitted. In the following, the difference from the first example is mainly described.

At step S1901, the installation unit 611 of the installer 610 installs the printer driver 303 in the OS 302 of the client device 10.

At step S1902, the OS 302 requests the configuration controller 323 of the printer driver 303 to convert the configuration information in the Devmode format into the configuration information in the PrintTicket format.

At step S1903, the configuration controller 323 retrieves the modification information B 631 from the configuration information storage unit 630. At this time, it is assumed that the modification information B 631 is not stored in the configuration information storage unit 630.

At step S1904, the configuration controller 323 reads out the configuration information in the Devmode format from DevmodePropertyBag.

At step S1905, the configuration controller 323 creates the configuration information in the PrintTicket format (which is referred to as "PrintTicket," hereinafter) from the read configuration information in the Devmode format.

At step S1906, the configuration controller 323 transmits a completion notification including the created PrintTicket to OS 302.

At step S1907, the OS 302 requests the configuration controller 323 to execute the exclusive process of the transmitted PrintTicket.

At step S1908, the configuration controller 323 executes the exclusive process of the configuration information. For example, the configuration controller 323 modifies or deletes, in the PrintTicket, the configuration item and configured value that may not be used, and creates the configuration information that can be used.

At step S1909, the configuration controller 323 transmits, to the OS 302, a completion notification including the PrintTicket to which the exclusive process is executed.

At step S1910, the OS 302 requests the configuration controller 323 to convert the configuration information in the PrintTicket format into the configuration information in the Devmode format.

At step S1911, the configuration controller 323 retrieves the state information from the PrintTicket. At this time, it is assumed that the state information is not included in the PrintTicket or the state information indicating the "invalidity" state is included in the PrintTicket.

At step S1912, the configuration controller 323 extracts the configuration information from the PrintTicket, and the configuration controller 323 stores, at step S1913, the extracted configuration information in the DevmodePropertyBag.

At step S1914, the configuration controller 323 transmits a completion notification to the OS 302.

At step S1915, the OS 302 reflects the details of the modification of the DevmodePropertyBag in the DEVMODE 1804, and, at step S1916, the OS 302 transmits a completion notification to the installer 610. Note that, in the following description, the process of steps S1911 through S1915 may be referred to as the "update process 1940 of the configuration information."

Subsequently, at step S1917 of FIG. 19B, the modification information retrieval unit 612 of the installer 610 reads out the modification information A 621 from the modification information storage unit 620.

At step S1918, the modification information saving unit 613 of the installer 610 saves the modification information A 621 read out by the modification information retrieval unit 612 in the configuration information storage unit 630. In the following, the modification information stored in the configuration information storage unit 630 is referred to as the modification information B 631.

Subsequently, an installer 610 executes the process of steps S1919 through S1926 so as to reflect the state information indicating that the state is "valid" in the PrintTicket.

At step S1919, the state information manager 614 of the installer 610 requests the OS 302 to retrieve the configuration information in the PrintTicket format. For example, the state information manager 614 requests the OS 302 to retrieve the configuration information in the PrintTicket format using a predetermined API (PTConvertDevModeToPrintTicket).

At step S1920, in response to the request for retrieving the configuration information in the PrintTicket format, the OS 302 requests the configuration controller 323 to convert the configuration information in the Devmode format into the configuration information in the PrintTicket format.

At step S1921, the configuration controller 323 retrieves the modification information B 631 from the configuration information storage unit 630. Note that, at this time, in the configuration information storage unit 630, the modification information B 631 is stored, as the modification information B 631 is stored in the configuration information storage unit 630 at step S1918.

At step S1922, the configuration controller 323 reads out the configuration information from the DevmodePropertyBag.

At step S1923, the configuration controller 323 creates the configuration information in the PrintTicket format (the PrintTicket) by reflecting the modification information B 631 retrieved at step S1921 in the configuration information read out at step S1922. At this time, the configuration controller 323 reflects, in the PrintTicket, the modification included in the modification information B 631 other than the modification of the one or more default values.

FIG. 20 is a diagram illustrating types of the modification information according to the embodiment. As illustrated in FIG. 20, the types of the modification information include "modification of the one or more default values," "not to display in the UI," "fix the configured value," and "restrict the configuration value."

The "modification of one or more default values" is information for indicating to modify the one or more default values of the configuration information. For example, in the modification information 1200 illustrated in FIG. 12, the configuration, such as "default="special" in the "devicesettings" corresponds to the "modification of the one or more default values." With this information, in the example of the modification information 1200 illustrated in FIG. 12, the default value of (item name="mediatype") (paper type) is modified to be "special" (special paper).

The "not to display in the UI" is information for indicating not to display the UI. For example, in the modification information 1200 illustrated in FIG. 12, the configuration, such as (hidden="yes") of the "devicesettings" corresponds to the "not to display the UI." With this information, in the example of the modification information 1200 illustrated in FIG. 12, the configuration item of (item name="duplex") (duplex printing) is not displayed in the UI.

The "fix the configured value" is information for indicating to fix the configured value. For example, in the modification information 1200 illustrated in FIG. 12, the configuration, such as (fixvalue="blackandwhite") of the (featurelock) corresponds to the "fix the configured value." With this information, in the example of the modification information 1200 illustrated in FIG. 12, the default value of item name="colorbw" (color configuration) is modified to be (fixvalue="blackandwhite") (monochrome).

The "restrict the configured value" is information for indicating to restrict the configured value. In the modification information 1200 illustrated in FIG. 12, the configuration, such as (pickone name="2pagespersheet") and (pickone name="4pagespersheet") of the "featurelock" corresponds to the "fix the configured value." With this information, in the example of the modification information 1200 illustrated in FIG. 12, the options for (item name="layout") (N-in-1 printing) is restricted to (pickone name="2pagespersheet") (2-in-1) and (pickone name="4pagespersheet") (4-in-1).

Furthermore, in FIG. 20, "0" indicates that the content of the modification information is to be reflected, and "–" indicates that the content of the modification information is not to be reflected. For example, for "PrintTicket→DEVMODE conversion, the state information is valid," "modification of the one or more default values," "fix the configured value," and "restrict the configured value" of the modification information are reflected in the configuration information. Further, for "PrintTicket→DEVMODE conversion, the state information is invalid," "fix the configured value" and "restrict the configured value" of the modification information are reflected in the configuration information. Furthermore, for "creating the PrintCapabilities," "fix the configured value" and "restrict the configured value" of the modification information are reflected in the configuration information.

Furthermore, it is indicated that, when the UI unit 305 displays the UI, "not to display the UI," "fix the configured value," and "restrict the configured value" of the modification information are reflected in the display of the UI screen.

Referring back to FIG. 19B, the description of the sequence diagram is continued.

At step S1924, the configuration controller 323 transmits, to the OS 302, a completion notification including the created PrintTicket. At step S1925, the OS 302 transmits, to the installer 610, a completion notification including the received PrintTicket.

At step S1926, the state information manager 614 of the installer 610 reflects the state information indicating the "valid" state (predetermined state) in the PrintTicket (the configuration information).

FIG. 21 is a diagram illustrating an example of the PrintTicket according to the third example. FIG. 21 illustrates an example of the PrintTicket 2100 in which the state information 2101 indicating the "valid" state (predetermined state) is reflected.

In the state information 2101 illustrated in FIG. 21, the part of "ns0000:JobCustomSettingFlag" represents the name of the configuration and the part of "ns0000:On" represents the configured value indicating the "valid" state. Note that the part of the PrintTicket 2100 illustrated in FIG. 21 other than state information 2101 is an example of the configuration information in the PrintTicket format created at step S1923.

As described above, in this example, when the modification information saving unit 613 saves the modification information in the configuration information storage unit 630 (during the installation), the state information manager 614 reflects the state information indicating the "valid" state (predetermined state) in the PrintTicket (configuration information).

Referring back to FIG. 19B, the description of the sequence diagram is continued.

At step S1927, the configuration information modifying unit 615 of the installer 610 requests the OS 302 to retrieve the configuration information in the Devmode format. The request for retrieving the configuration information includes the PrintTicket 2100 that includes the state information 2101 indicating the "valid" state.

At step S1928, the OS 302 requests the configuration controller 323 to convert the configuration information in the PrintTicket format into the configuration information in the Devmode format.

At step S1929, the configuration controller 323 retrieves the state information from the PrintTicket. At this time, the state information is set to the "valid" state.

At step S1930, the configuration controller 323 retrieves the modification information B 631 from the configuration information storage unit 630.

At step S1931, the configuration controller 323 extracts the configuration information from the PrintTicket.

At step S1932, the configuration controller 323 reflects the modification information (which includes the modification of the one or more default values) in the extracted configuration information and stores the configuration information in the DevmodePropertyBag. For example, the configuration controller 323 reflects, in the configuration information, "modification of the one or more default values", "fix the configured value", and "restrict the configured value" of the modification information, which are illustrated in FIG. 20.

At step S1933, the configuration controller 323 verifies the validity of the modification information, depending on necessity. The process of verifying the validity includes, for example, when the modification information includes a function that is not supported or information that is not supported as the default configuration, a process of ignoring the function or the information (the default configuration is not modified). Furthermore, the process of verifying the validity includes, for example, when two configured values, which may not be simultaneously selected, are set as the default values of the modification information, a process of enabling one of the configured values or disabling both the configured values. As described above, the process of verifying the validity includes, when the modification information includes a modification item that is not selected in a normal operation, a process, by the configuration controller 323, of determining how to apply the modification information.

At step S1934, the configuration controller 323 transmits, to the OS 302, a completion notification including the configuration information in the Devmode format. At step S1935, the OS 302 transmits the transmitted completion notification to the installer 610.

At step S1936, the configuration information modifying unit 615 of the installer 610 sets the configuration information in the Devmode format included in the completion notification to be the one or more default values of the configuration information of the printer driver 303. For example, the configuration information modifying unit 615 requests the OS 302 to set the one or more default values of the configuration information using a predetermined API provided by the OS 302.

At step S1937, the OS 302 sets the configuration information in the Devmode format as the one or more default values of the configuration information and transmits, to the installer 610, a completion notification indicating that the setting is completed.

Note that, in the example, the state information indicating the "valid" state is reflected in the PrintTicket 1802, which is temporarily stored in the memory 1801, so that the process of updating the state information to be the "invalid" state is not required.

As described above, in this example, during installation of the V4 printer driver, the modification information stored in an external storage area can also be easily reflected in the one or more default values of the configuration information of the printer driver.

(Process of Setting the Configuration Information)

Figure 22:
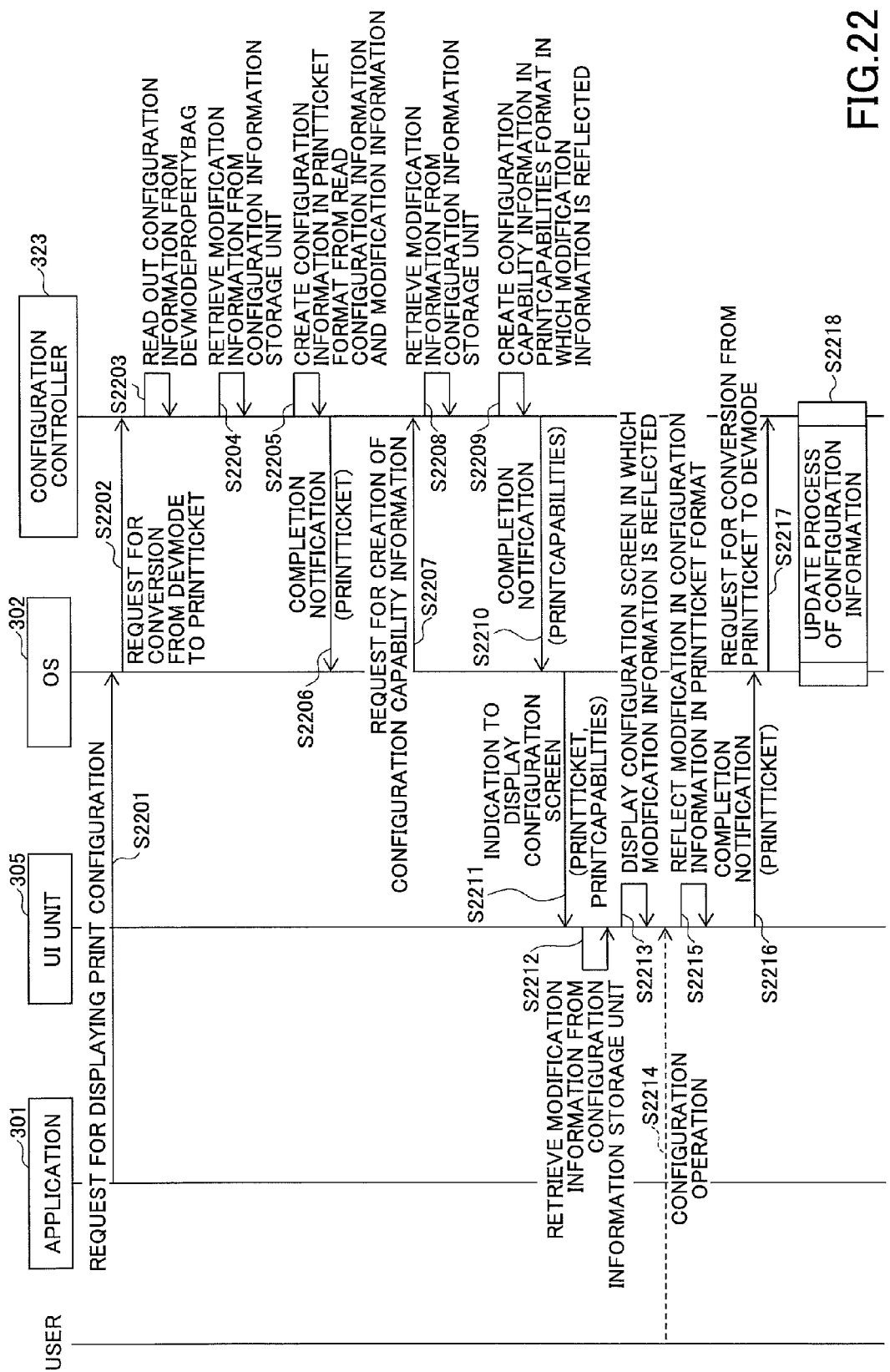
FIG. 22 is a sequence diagram illustrating an example of a process of setting configuration information according to the embodiment.

FIG. 22 is a sequence diagram illustrating an example of a process of setting the configuration information according to the embodiment. This process illustrates an example of a process that is executed after the printer driver 303 is installed in the client device 10 by the installation process of the printer driver according to any one of the first through third examples.

At step S2201, the application 301 transmits, to the OS 302, a request for displaying a print configuration, in response to detecting a print configuration operation by a user.

At step S2202, the OS 302 requests the configuration controller 323 of the printer driver 303 to convert the configuration information in the Devmode format into the configuration information in the PrintTicket format.

At step S2203, the configuration controller 323 reads out the configuration information in the Devmode format from the DevmodePropertyBag.

At step S2204, the configuration controller 323 retrieves the modification information B 631 from the configuration information storage unit 630.

At step S2205, the configuration controller 323 creates the configuration information in the PrintTicket format (the PrintTicket) by reflecting the retrieved modification information B 631 in the configuration information, which is read out. At this time, as illustrated in FIG. 20, the configuration controller 323 creates the PrintTicket in which "fix the configured value" and "restrict the configured value" of the modification information are reflected.

At step S2206, the configuration controller 323 transmits, to the OS 302, a completion notification including the created PrintTicket.

At step S2207, the OS 302 requests the configuration controller 323 to create the configuration capability information (PrintCapabilities).

At step S2108, the configuration controller 323 retrieves the modification information B 631 from the configuration information storage unit 630.

At step S2209, the configuration controller 323 creates the configuration capability information (which is referred to as "PrintCapabilities," hereinafter) in the PrintCapabilities format in which the retrieved modification information is reflected. For example, as illustrated in FIG. 20, the configuration controller 323 creates the PrintCapabilities in which "fix the configured value" and "restrict the configured value" of the modification information is reflected.

At step S2210, the configuration controller 323 transmits a completion notification including the created PrintCapabilities to OS 302.

At step S2211, the OS 302 indicates the UI unit 305 to display the configuration screen. The indication for causing the configuration screen to be displayed includes the PrintTicket (the configuration information) and the PrintCapabilities (the configuration capability information).

Note that, when the application 301 is the store device application 311, the UI unit 305 is the store device application 304; and, when the application 301 is the desktop application 321, the UI unit 305 is the extension configurator 313.

At step S2212, the UI unit 305 retrieves the modification information B 631 from the configuration information storage unit 630.

At step S2213, the UI unit 305 causes the display device 102 to display the configuration screen of the configuration information using the PrintTicket and the PrintCapabilities, and "not to display the UI," "fix the configured value," and "restrict the configured value" of the modification information. As a result, the configuration screen 1720, such as that of illustrated in FIG. 17B, is displayed by the display device 102.

At step S2214, the UI unit 305 receives a configuration operation (the modification operation of the configuration information) by a user.

At step S2215, the UI unit 305 reflects the user's configuration operation in the configuration information in the PrintTicket format.

At step S2216, the UI unit 305 transmits a completion notification including the modified PrintTicket to the OS 302.

At step S2217, the OS 302 requests the configuration controller 323 to covert the modified PrintTicket into the configuration information in the Devmode format.

At step S2218, the configuration controller 323 and the OS 302 execute the update process 1940 of the configuration information, such as that of illustrated in steps S1911 through S1915 of FIG. 19A.

As described above, the printer driver 303 according to the embodiment of the present invention can create the configuration information in the PrintTicket format while reflecting, in the configuration information, the modification information B 631 stored in the configuration information storage unit 630. Further, the printer driver 303 can create the configuration capability information in the PrintCapability format while reflecting, in the configuration capability information, the modification information B 631 stored in the configuration information storage unit 630. Furthermore, the UI unit 305 can cause the display device 102 to display the UI screen (the configuration screen) while reflecting, in the UI screen, the modification information B 631 stored in the configuration information storage unit 630.

As described above, according to the embodiment of the present invention, during installation of a V4 printer driver, configuration data stored in an external storage area can be read, and the configuration data can be easily reflected in one or more default values of the configuration information of the V4 printer driver.

The present invention is not limited to the specifically disclosed embodiments, and variations and modifications may be made without departing from the scope of the present invention.

The present application is based on and claims the benefit of priority of Japanese Priority Application No. 2016-180202, filed on Sep. 15, 2016, and Japanese Priority Application No. 2017-148474, filed on Jul. 31, 2017, the entire contents of which are hereby incorporated herein by reference.

What is claimed is:

1. An information processing device for controlling printing, the information processing device including
   a processor; and
   a memory that stores instructions, which when executed, cause the processor to execute the following steps:
   installing a printer driver in the information processing device, wherein the printer driver is for providing configuration information for printing using a script that controls the configuration information for printing;
   retrieving modification information for the configuration information from a modification information storage that is inaccessible by the script;
   storing the retrieved modification information in a configuration information storage, the configuration information storage being accessible by the script; and
   causing the script to read the modification information stored in the configuration information storage, and configuring, as a default value of the configuration information, the configuration information by applying the modification information to previous modification information stored in the configuration information storage.

2. The information processing device according to claim 1, wherein the steps executed by the processor further include
   setting state information included in the configuration information storage to be a predetermined state when the step of storing stores the modification information in the configuration information storage.

3. The information processing device according to claim 1, wherein the steps executed by the processor further include
   setting state information included in the configuration information storage to be a predetermined state when the step of installing is started.

4. The information processing device according to claim 1, wherein the steps executed by the processor further include
   reflecting state information indicating a predetermined state in the configuration information when the step of storing stores the modification information in the configuration information storage.

5. The information processing device according to claim 2, wherein the steps executed by the processor further include
   upon detecting that the state information indicates the predetermined state, creating the configuration information using the modification information stored in the configuration information storage.

6. The information processing device according to claim 2, wherein the steps executed by the processor further include
   setting the state information in a state other than the predetermined state after the configuration information created using the modification information stored in the configuration information storage is configured as the default value of the configuration information.

7. The information processing device according to claim 2, wherein the steps executed by the processor further include upon detecting that the state information is not set to the predetermined state, creating the configuration information without using the modification information stored in the configuration information storage.

8. The information processing device according to claim 2, wherein the configuration information includes first configuration information in a first format and second configuration information in a second format, the second format being different from the first format, wherein the step of providing includes converting the first configuration information into the second configuration information; and converting the second configuration information into the first configuration information, and wherein, when the first configuration information is converted into the second configuration information, upon detecting that the state information indicates the predetermined state, the processor creates the second configuration information using the modification information stored in the configuration information storage.

9. The information processing device according to claim 8, wherein the step of providing converts the second configuration information created using the modification information stored in the configuration information storage into the first configuration information, and wherein the processor configures the first configuration information obtained by converting the second configuration information as the default value of the configuration information.

10. The information processing device according to claim 1, wherein the step of providing reflects the modification information stored in the configuration information storage in configuration capability information indicating a configured value that is configurable in the printer driver.

11. The information processing device according to claim 1, wherein the steps executed by the processor further include displaying a configuration screen of the printer driver; and reflecting the modification information stored in the configuration information storage in the configuration screen.

12. An information processing system comprising:

an information processing device that control printing; and an image forming apparatus that executes printing in accordance with the control of the information processing device, wherein the information processing device includes a processor; and a memory that stores instructions, which when executed, causes the processor to execute the following steps:

installing a printer driver in the information processing device, wherein the printer driver is for providing configuration information for printing using a script that controls the configuration information for printing;

retrieving modification information for the configuration information from a modification information storage that is inaccessible by the script;

storing the retrieved modification information in a configuration information storage, the configuration information storage being accessible by the script; and causing the script to read the modification information stored in the configuration information storage, and configuring, as a default value of the configuration information, the configuration information by applying the modification information to previous modification information stored in the configuration information storage.

13. An information processing method executed by an information processing device for controlling printing, the information processing method comprising:

installing a printer driver in the information processing device, wherein the printer driver is for providing configuration information for printing using a script that controls the configuration information for printing;

retrieving modification information for the configuration information from a modification information storage that is accessible by the script;

storing the retrieved configuration information in a configuration information storage, the configuration information storage being accessible by the script; and causing the script to read the modification information stored in the configuration information storage, and configuring, as a default value of the configuration information, the configuration information by applying the modification information to previous modification information stored in the configuration information storage.

* * * * *